(12) United States Patent
Daum et al.

(10) Patent No.: US 11,150,885 B2
(45) Date of Patent: Oct. 19, 2021

(54) METHOD AND SYSTEM FOR VEHICLE SOFTWARE MANAGEMENT

(71) Applicant: General Electric Company, Schenectady, NY (US)

(72) Inventors: Wolfgang Daum, Erie, PA (US); Mark Bradshaw Kraeling, Melbourne, FL (US); Vinaykanth V. Mudiam, Lawrence Park, PA (US); Todd William Goodermuth, Melbourne, FL (US); Marc Ballard, Erie, PA (US); Paul Connolly, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 185 days.

(21) Appl. No.: 16/153,177

(22) Filed: Oct. 5, 2018

(65) Prior Publication Data

US 2019/0050220 A1 Feb. 14, 2019

Related U.S. Application Data

(63) Continuation-in-part of application No. 13/972,991, filed on Aug. 22, 2013, now abandoned.
(Continued)

(51) Int. Cl.
*G06F 8/65* (2018.01)
*G06F 9/445* (2018.01)
(Continued)

(52) U.S. Cl.
CPC ............... *G06F 8/65* (2013.01); *B61L 3/006* (2013.01); *B61L 15/0072* (2013.01);
(Continued)

(58) Field of Classification Search
CPC .... G06F 8/65; G06F 9/44505; G06F 11/1433; G06F 2201/84; B61L 3/006;
(Continued)

(56) References Cited

U.S. PATENT DOCUMENTS 7,096,464 B1 8/2006 Weinmann
7,188,341 B1 3/2007 Hawthorne et al.
(Continued)

FOREIGN PATENT DOCUMENTS

JP 2008299378 A 12/2008

OTHER PUBLICATIONS

Motorola, "Case study A series about Canopy wireless broadband in the marketplace.", pp. 1-8, 2004.
(Continued)

*Primary Examiner* — Doon Y Chow
*Assistant Examiner* — Timothy P Duncan
(74) *Attorney, Agent, or Firm* — The Small Patent Law Group LLC; John P. Darling

(57) ABSTRACT

A method includes receiving, at a data hub onboard an asset, a new configuration file, a service program, and a software update of a software application of the asset from a remote location. The data hub includes a current configuration file that indicates a current configuration state of the software application. The new configuration file indicates an updated configuration state of the software application with the software update. The service program includes work instructions for applying the updated configuration state to the software application. The method includes displaying the current configuration file and the new configuration file onboard the asset using the data hub. The method also includes updating the software application with the updated configuration state according to the work instructions of the service program using the data hub.

23 Claims, 8 Drawing Sheets

Related U.S. Application Data

(60) Provisional application No. 61/692,204, filed on Aug. 22, 2012.

(51) Int. Cl.
- *G06F 11/14* (2006.01)
- *B61L 3/00* (2006.01)
- *B61L 15/00* (2006.01)
- *H04L 29/08* (2006.01)

(52) U.S. Cl.
CPC ...... *B61L 15/0081* (2013.01); *G06F 9/44505* (2013.01); *G06F 11/1433* (2013.01); *H04L 67/12* (2013.01); *H04L 67/34* (2013.01); *G06F 2201/84* (2013.01)

(58) Field of Classification Search
CPC .. B61L 15/0072; B61L 15/0081; H04L 67/12; H04L 67/34
See application file for complete search history.

(56) References Cited

U.S. PATENT DOCUMENTS

| | | |
|---|---|---|
| 8,607,221 B1 | 12/2013 | Donahue et al. |
| 2003/0126592 A1 | 7/2003 | Mishra et al. |
| 2004/0003266 A1 | 1/2004 | Moshir et al. |
| 2004/0015946 A1 | 1/2004 | Te'eni et al. |
| 2004/0031028 A1 | 2/2004 | Hunt et al. |
| 2005/0216902 A1 | 9/2005 | Schaefer |
| 2005/0216903 A1 | 9/2005 | Shaefer |
| 2005/0262076 A1 | 11/2005 | Voskuil |
| 2007/0185624 A1* | 8/2007 | Duddles .................. G06F 8/654 701/1 |
| 2007/0219680 A1* | 9/2007 | Kumar .................. B61L 3/006 701/19 |
| 2008/0028389 A1 | 1/2008 | Genty et al. |
| 2008/0216066 A1 | 9/2008 | Oh |
| 2009/0119657 A1* | 5/2009 | Link, II .................. G06F 8/65 717/171 |
| 2009/0210868 A1 | 8/2009 | Parthasarathy |
| 2009/0293051 A1 | 11/2009 | Krywaniuk |
| 2010/0107150 A1 | 4/2010 | Kamada et al. |
| 2011/0022545 A1 | 1/2011 | Durney |
| 2013/0067236 A1 | 3/2013 | Russo et al. |
| 2013/0079950 A1* | 3/2013 | You .......................... G06F 8/66 701/1 |
| 2013/0344802 A1 | 12/2013 | Armour et al. |
| 2014/0172270 A1* | 6/2014 | Lee .................... F02D 41/0087 701/102 |
| 2018/0093623 A1* | 4/2018 | Terwilliger ......... B60R 16/0236 |
| 2018/0201285 A1* | 7/2018 | Brooks .................. B61L 23/06 |

OTHER PUBLICATIONS

NEC Portugal, "NEC Portugal supplies GSM-R radios to Finnish railway operator VR-Group", Jun. 26, 2012.

\* cited by examiner

METHOD AND SYSTEM FOR VEHICLE SOFTWARE MANAGEMENT

CROSS-REFERENCE TO RELATED APPLICATIONS

This application is a continuation-in-part of, and claims priority to and the benefit of the filing date of U.S. patent application Ser. No. 13/972,991, filed Aug. 22, 2013, and entitled "METHOD AND SYSTEM FOR SOFTWARE MANAGEMENT" (the "991 application"), which is hereby incorporated by reference in its entirety. The 991 application claims priority to and the benefit of the filing date of U.S. Provisional Application No. 61/692,204, filed on Aug. 22, 2012, and entitled "SOFTWARE MANAGEMENT SYSTEM AND METHOD", which is hereby incorporated by reference in its entirety.

FIELD

One or more embodiments of the subject matter described herein generally relate to systems and methods for software management of one or more mobile and/or stationary assets.

BACKGROUND

Many mobile and/or stationary assets require regular service to update software applications thereof. Examples of such mobile and/or stationary assets include mobile electronic devices (e.g., smart phones, personal digital assistants (PDAs), tablet computers, e-readers, netbook computers, laptop computers, mobile communication devices, and/or the like), stationary electronic devices (e.g., desktop computers, servers, switchboards, switching devices, mainframes, and/or the like), locomotives and other rail vehicles, marine vessels, aircraft, other off-highway vehicles, automobiles and other on-highway vehicles, mining equipment, wind turbines, signaling devices, electrical power generators, and/or the like. Examples of software applications of assets that require regular updates include operating systems, vehicle control systems, equipment control systems, business applications, entertainment applications, and/or the like.

Known systems that manage software updates to assets are not without disadvantages. For example, one disadvantage of at least some known systems that manage software updates is that software updates take longer than is desired, which may increase a down time of the asset wherein the asset is not operational. Another disadvantage of at least some known systems that manage software is that software update data may need to be available (e.g., stored) at a service location where the software update is performed. Examples of such software update data include the intended updated configuration state of a software application, the instructions for performing the update, the actual software update, and/or the like. Yet another disadvantage of at least some known systems that manage software updates is that the service entity that is performing the software update determines the sequence and steps required to complete the update, which may be prone to errors that cause the software application to malfunction and/or fail to operate.

Another disadvantage is that known systems of software provisioning and version management may push updates without regard to the current configuration status of a software application. For example, software update data that is available at a service location where a software update is being performed may be out of date such that the software update data does not reflect the configuration state of the latest version of the software application. Such out of date update information may cause the software application to be updated to an older version and therefore not reflect the current capabilities, functions, and/or the like of the latest version. Moreover, such out of date update information may be incompatible with previous and/or future versions of the software application and/or may be incompatible with the current version of another software application of the asset. Such incompatible update information may cause the software application to malfunction and/or fail to operate once the update is completed or when a future update is applied. In some situations, out of date instructions for performing a software update may cause the software update to be improperly applied to the software application, which may cause the software application to malfunction and/or fail to operate. Further, an out of date configuration state and/or out of date instructions for performing a software update may cause the software application to have an out of date configuration of hardware components, which may cause the software application to malfunction and/or fail to operate.

Another disadvantage of at least some known systems that manage software updates is that the operator performing the software update performs the update using a local computer at the service location. The operator may be required to carry the local computer with the software update data to the asset to complete the update, which may cause confusion and/or may be a burden to the operator.

BRIEF DESCRIPTION

In accordance with an embodiment, a method is provided that includes receiving, at a data hub onboard an asset, a new configuration file, a service program, and a software update of a software application of the asset from a remote location. The data hub includes a current configuration file that indicates a current configuration state of the software application. The new configuration file indicates an updated configuration state of the software application with the software update. The service program includes work instructions for applying the updated configuration state to the software application. The method includes displaying the current configuration file and the new configuration file onboard the asset using the data hub. The method also includes updating the software application with the updated configuration state according to the work instructions of the service program using the data hub.

In an embodiment, a system is provided that includes an asset having a software application and a data hub located onboard the asset. The data hub includes a current configuration file that indicates a current configuration state of the software application. The data hub is communicatively connected to a remote location. The data hub is configured to automatically receive from the remote location, without prompting a user, a new configuration file, a service program, and a software update of the software application of the asset. The new configuration file indicates an updated configuration state of the software application with the software update. The service program includes work instructions for applying the updated configuration state to the at least one software application. The data hub is configured to update the software application with the updated configuration state according to the work instructions of the service program including applying the software update to at least one of an operating system or a software program of the software application.

In an embodiment, a system is provided that includes an asset having a plurality of software applications and a data hub located onboard the asset. The data hub includes configuration files for each software application that indicates a current configuration state of the software application. The data hub is communicatively connected to a remote location. The data hub is configured to receive from the remote location at least one service program and first and second updated configuration states of first and second software applications of the plurality of software applications. The at least one service program includes work instructions for applying the first and second updated configuration states to the first and second software applications, respectively. The data hub is configured to automatically at least one of reorder application of the first and second updated configuration states to the first and second software applications, respectively, or cancel application of one of the first or second updated configuration states to the first and second software applications, respectively.

While multiple embodiments are disclosed, still other embodiments of the described subject matter will become apparent from the following Detailed Description, which shows and describes illustrative embodiments of disclosed inventive subject matter. As will be realized, the inventive subject matter is capable of modifications in various aspects, all without departing from the spirit and scope of the described subject matter. Accordingly, the drawings and detailed description are to be regarded as illustrative in nature and not restrictive.

DETAILED DESCRIPTION

Figure 1:
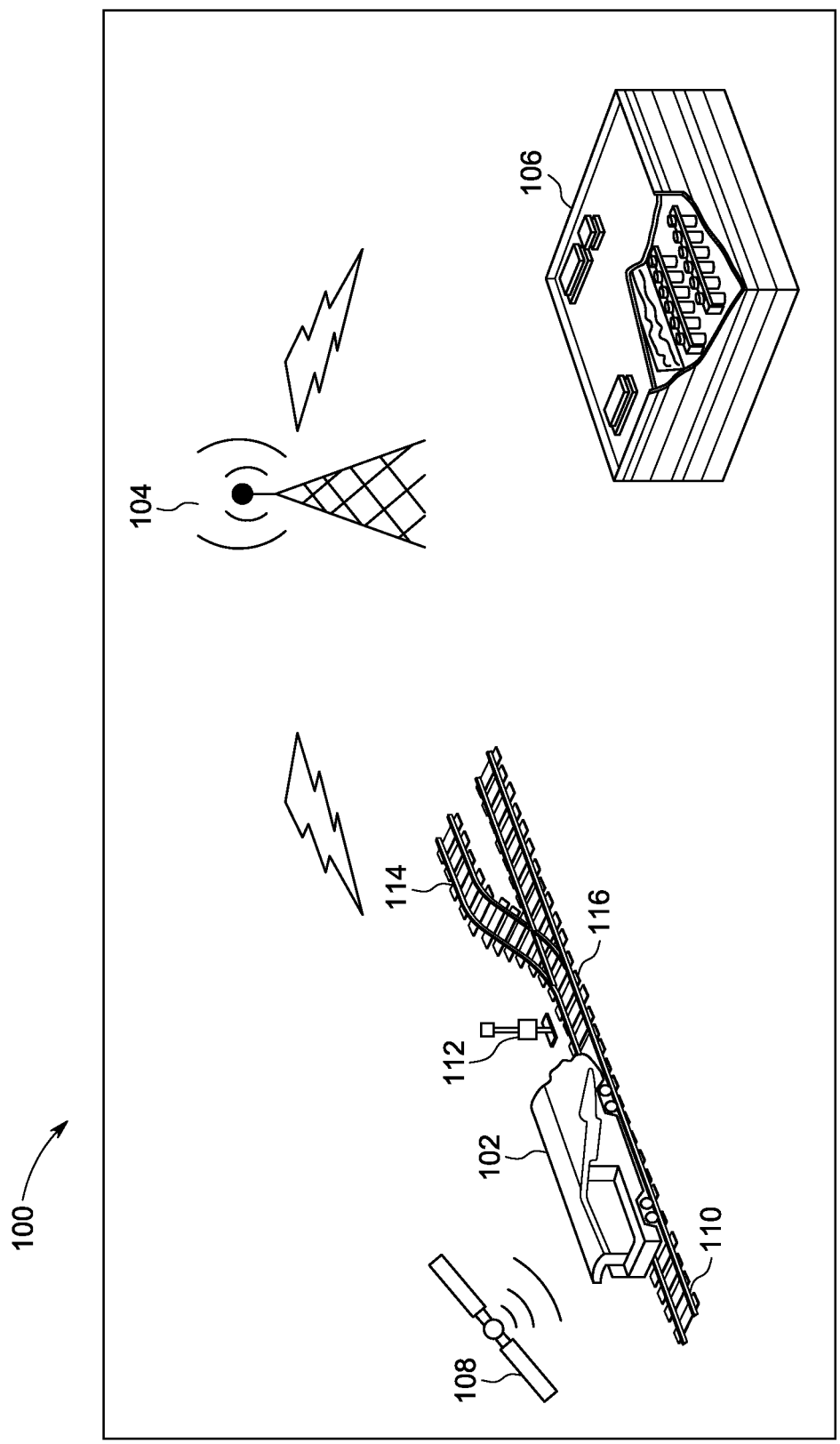
FIG. 1 is a graphical diagram of a system according to an embodiment of the inventive subject matter described herein.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuits. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

Embodiments of the subject matter disclosed herein relate to systems and methods for controllers, software, software management, communications, and the like for mobile and/or stationary equipment management.

Some embodiments may be included in various types of equipment and particularly fleets of equipment. In the fleet, the equipment may of the same type in some instances or of different types in other instances. Further, the fleet can be dynamically identified if desired. Examples of such equipment may include a stationary power generator, a mobile communication device, or a vehicle. Some examples of suitable vehicles may include a locomotive or an automobile. Other suitable types of vehicles may include on-highway vehicles, off-highway vehicles, mining equipment, aircraft, and marine vessels. Other suitable type of stationary applications may include wind turbines or signaling devices.

The following definitions, acronyms, and abbreviations may be used in this document: ACC refers to an Ancillary Card Cage; DP refers to a Distributed Power System, such as LOCOTROL Distributed Power System commercially available from GE Transportation; Evolution refers to GE Transportation Evolution Series Locomotive; HUB refers to an Over The Air Application functionality hub; OS refers to an operating system; OTA refers to Over the Air; ERP refers to enterprise resource planning system, to include billing and supply chain management; and RMD refers to Remote Monitoring and Diagnostics functionality. CMU refers to a communication management unit. SDIS refers to Smart Display Information Screens. CCA refers to consolidated control architecture and includes one or more microprocessors and controllers. A LIG refers to a locomotive information gateway.

Exemplary embodiments of the methods and systems described herein will be described below with reference to assets that are rail vehicles traveling within a transportation network. But, the assets of the methods and systems described herein are not limited to rail vehicles specifically, nor vehicles in general. Rather, the assets of the methods and systems described herein may each be any type of mobile or stationary asset, such as, but not limited to, mobile electronic devices, stationary electronic devices, rail vehicles, locomotives, marine vessels, aircraft, other off-highway vehicles, on-highway vehicles, automobiles, mining equipment, wind turbines, signaling devices, electrical power generators, and/or the like. Examples of mobile electronic devices include, but are not limited to, smart phones, personal digital assistants (PDAs), tablet computers, e-readers, netbook computers, laptop computers, mobile communication devices, and/or the like. Examples of stationary electronic devices include, but are not limited to, desktop computers, servers, switchboards, switching devices, mainframes, and/or the like. In some embodiments, a system and/or a method includes managing a plurality of assets with data hubs as described herein, wherein the assets may each be the same type of asset or may include two or more different types of assets.

Each of the software applications of the assets described herein may have multiple software components, such as, but not limited to, an operating system, one or more programs that run on the operating system, a configuration file, and/or the like. The configuration file of a software application indicates a configuration state (i.e., version) of the software application. The configuration file may include any data for indicating a configuration state of the software application, such as, but not limited to, an indication of a version of the software application overall, an indication of a version of an operating system of the software application, an indication of a version of a software program of the software application, a software architecture of the software application, a list of one or more hardware components that are associated with the software application, an architecture of hardware associated with the software application, a log, and/or the like. As used herein, updating a software application with an updated configuration state may include updating any of the software components of the software application. Each software application of the assets described herein may be a software application that is provided by the manufacturer and/or seller of the asset, or may be a software application that is provided by a another entity (i.e., a third party) besides the manufacturer and/or seller of the asset. Each software application of an asset may be written for any software standard (e.g., an operating system standard, a programming language standard, and/or the like). Each asset may have any number of different software applications that are written for any number of different software standards.

Exemplary embodiments of the methods and systems described herein will be described below with reference to software applications of rail vehicles. But, the software applications of the methods and systems described herein are not limited to being a software application of a rail vehicle. Rather, software applications of the methods and systems described herein may each by any type of software application, such as, but not limited to, an operating system, a vehicle control system, an equipment control system, a business application, an entertainment application, and/or the like. Examples of vehicle control systems include, but are not limited to, movement control systems that control movement of the vehicle, locomotive control systems, fuel management systems (e.g., SmartBurn™, which is commercially available from GE Transportation of Erie, Pa.), distributed power systems (e.g., LOCOTROL™, which is commercially available from GE Transportation of Erie, Pa.), navigation systems, energy management systems, fuel injection systems, black box and/or other log recording applications (e.g., the GE Transportation ERAD system, which is commercially available from GE Transportation of Erie, Pa.), RMD systems, video functionality (e.g., LOCO-CAM™, which is commercially available from GE Transportation of Erie, Pa.), fuel optimization systems (e.g., Trip Optimizer™, which is commercially available from GE Transportation of Erie, Pa.), and/or the like. Examples of equipment control systems include, but are not limited to, fuel management systems, energy management systems, fuel injection systems, black box and/or other log recording applications, RMD systems, video functionality, fuel optimization systems, control systems that control one or more functions of a piece of equipment (such as, but not limited to, mining equipment, a wind turbine, a signaling device, an electrical power generator, a server, a mainframe, a switchboard, a switching device, and/or the like), and/or the like.

Examples of business applications include, but are not limited to, applications that process and/or complete business transactions (e.g., sales, leases, licenses, contracts, debit card transactions, credit card transactions, and/or the like) and/or the like. Examples of entertainment applications include, but are not limited to, games, learning tools, applications that gather and/or present news and/or other information, and/or the like.

In an embodiment, a system may be provided that has an architecture including multiple modules or components that interact to achieve desired functionality with regard to a fleet of equipment. With regard to suitable system components, one may be an interface component. Another may be in the form of infrastructure needed to route messaging to and from the equipment fleet. Yet others include onboard communications equipment, an OTA hub, and a back-office software component.

The interface component allows a user to facilitate a maintenance and repair service by, for example: updating software in a software database; managing software specified for the equipment fleet, and initiating the delivery of update packages to the equipment and to service shops for the equipment.

Regarding the communications infrastructure, the infrastructure may include a communication blanket between the back-office and the vehicle. Suitable communication technologies may include cellular networks, satellite, wi-fi, blue tooth, and the like. The following items may form at least a part of the communications infrastructure. A communications security layer, for example, may include point-to-point security between back-office and OTA hub onboard the vehicle. A suitable protocol may be defined for separate implementation by the OTA hub and the back-office.

In an embodiment, the communications infrastructure may dynamically select a communications medium for OTA downloads based on situational circumstances (such as availability, bandwidth constraints, bandwidth cost, network stability, available security protocols, and the like). In some instances, download images can be restricted to only using certain types of communications, such as critical images not being allowed over unsecured Wi-Fi networks.

And, with regard to onboard communications and equipment, the communications infrastructure includes the blanket of communications that occur between the back-office and the vehicle. The onboard communications may have a network connection with the device that may be serving as the OTA hub. The onboard communications may allow the ports, protocol, and access that the OTA hub may have to connect directly to the back-office component. During use, the OTA hub can determine connectivity of the various paths that may exist onboard the vehicle. The OTA architecture may support communication requirements from a plurality of differing vendors, types of data, and sources. These may be prioritized, for example, based on mission criticality or usage. An example of selection based on usage may include streaming video that may be set for fewer interruptions as measured by bandwidth constraints, stability, and buffer availability.

The OTA hub may manage software updating functionality. In an embodiment, the update process may use a pull process, where the "OTA hub" initiates update status requests and manages the update. As such, the hub may be responsible for authorization and onboard configuration management. Such an arrangement may simplify the access security process relative to a contrasting system that has externally initiated access grants. Individual applications may be managed by the over-the-air software update process.

In an embodiment, the OTA hub may reside on the vehicle and manages and delivers the software to all OTA applications onboard the vehicle. The OTA hub may retain any images, configuration files, or programs that may be sent, along with previous versions in case there may be a need to go back to an earlier version. The OTA hub may communicate through other communication systems to update components that may not necessarily be directly connected to the hub. And, the OTA hub may include and initiate rules based on the applications present, running and/or available to run that can determine when software can be updated in certain instances.

During use, the OTA hub may have a communications connection to each of the devices that need to be updated—including the possibility that an application may be used as a pass-through for the hub to communicate to the device. These update links, may be of a temporary nature both logically and physically. The OTA hub may support, for example, updating over Ethernet, RS-232 Serial, and RS-422 serial. Future communications methods could include LON, CAN, FlexRay, and others. A handshake between the OTA hub and application may have to exist, where the application reports its version upon power-up so that the hub knows which version may be running at any given time. Rules may exist by application for when it may be appropriate to update software and when it is not appropriate. Some applications may have rules like "unlinked, not moving" where others may not have rules at all.

The OTA hub may support the requirements that some application required "attended" updating of software, such as the control system. In this scenario, multiple transactions between the OTA hub and the application may exist for user intervention and steps that need to take place. The OTA hub may support updating third-party devices over the variety of communications paths. Statistics for updating may be kept by the OTA hub (and transfer to the back-office periodically) that includes (by application) when the download started, when the download ended, the success of the download, and any error codes that have been reported as part of the update.

The OTA applications may be devices that may be able to get software or configuration updates over the air from the OTA hub. The applications could be from multiple third-parties. Each application may have multiple software components, such as a program, OS, or configuration file. Each software component can be updated separately. The hub may have to support each of these configuration files, programs, logs, and operating system. Each OTA application may protect the integrity of the OTA application and reject a software update under determined conditions.

For each OTA application, during update, minimal user intervention (such as powering off and powering on) may be required. For certain applications where conditions of the vehicle may be important before software may be updated, user interaction may initiate software update and/or the vehicle operation status may be queried and an update prevented until a determined operational state may be achieved. For example, the vehicle operation status may be defined by a number of potential operational states, including a stopped condition and a moving condition, among others. The stopped condition may include one or both of a vehicle (e.g., locomotive) not moving or having its brakes applied.

In some embodiments, after querying the operational status, the update may be performed if the operational status of the locomotive is the stopped condition, with the update not applied if the locomotive is not in the stopped condition. For example, the update may be automatically received at a first time (for example, while the locomotive is moving), but the update may not be applied until the locomotive stops moving, or stops moving for a predetermined amount of time. In some embodiments, the update is not applied unless the locomotive is planned to be stopped is greater than a designated threshold. For example, a trip plan (which automatically controls throttle and/or brake settings of the locomotive along the route) or other pre-planned schedule of the locomotive may specify a planned amount of time that the locomotive will be stopped, and the update is only applied when the planned amount of time exceeds the threshold. The threshold in various embodiments is at least as long as the amount of time required to perform the update. For example, the threshold may be set to include an amount of time at least as long as the time required to perform the update plus a buffer time that is long enough to allow for reverting back to a previous software configuration if the update fails. For example, if the update takes 20 minutes, and it takes 10 additional minutes to revert to a previous software configuration if the update fails, then the threshold may be set at 30 minutes or higher. In various embodiments, a failed update may include an update that takes longer than expected to be performed.

Further still, in some embodiments, the trip plan may be modified to accommodate an update. As one example, if an update takes slightly longer than expected to be performed, then the trip plan may be modified to accommodate the longer update. As another example, if a planned stop called for by a trip plan (or other schedule) is not long enough to satisfy the threshold time but may be extended to allow the update (e.g., based on the amount of additional time required and/or the urgency of the update), the trip plan may be modified to make the planned stop long enough to perform the update. For example, if the trip plan has a previously scheduled 25 minute stop, and an update having a sufficient urgency is received prior to the stop that calls for a 30 minute threshold time, the stop may be extended by a modified trip plan to accommodate the update.

Each OTA application may ensure the transaction between the OTA application and the OTA hub has been successful before applying (such as message integrity checking during transfer). The application may consider having the ability to reverting to prior image in case the update may be not successful—but will be dependent on the application hardware and architecture (not the OTA architecture).

The back-office software component may manage the over-the-air software update list for the entire fleet, and facilitates a user to upload software to the server, and further can track which software version has been approved for particular fleets or fleet portions by user. When a software update or validation service may be requested at a specific item of equipment, a check may be made for newly available software versions. If available, and the back-office package initiates sending a software download to the OTA hub application on the equipment. A notice may be sent to a service facility where the equipment may be located or where the equipment may be scheduled to arrive to inform them of the software update. The back-office software may have to accept a message from the OTA hub that tells the back-office software the update has been successfully applied.

Regarding security, the back-office solution may include point-to-point security with the OTA hub onboard the vehicle. The services and maintenance system for OTA may comply with scalable infrastructure security requirements, and further may comply with requirements needed for plural user B2B links. The interface system for OTA may have to support multiple usernames, with varying permissions for viewing, altering, and administrating. The system shall support both a pull architecture where the OTA hub on the vehicle asks if any new images may be available—currently to be implemented; and, a push architecture where the system tells the vehicle that a new image may be available.

Periodic checking between the back-office and OTA hub may communicate the versions currently running on the OTA applications. The OTA hub current software that may be in process of updating, but has not been able to fully update may be noted and flagged. Further, any software updates that the back-office has ready for deployment, but which have not yet been released to the OTA hub (e.g., due to prerequisites with other software that may have to be loaded) is noted and tracked.

With further regard to version control, an embodiment of the system may maintain version control for software versions that may be allowed for equipment (by type, configuration, and user, and the like). A user may revert back to an earlier version of software, and may delete any existing orders or requests for future software updates that may be no longer wanted. Software load files may be allowed to have multiple labels—for instance having a "User X Approved Load" labeling of software could be different than a "User Y Approved Load", and both could be different than a defined baseline of software loaded in the system. Username, date, time, and other access information may be logged for every user change made to the configuration in the system. The system may support a more "active" tracking in the future where components that may be important in the selection of software or configuration files (such as the turbo) can be tracked inside the database per vehicle.

With regard to software updating notification, when a software update may be available on a vehicle that requires a "commit intervention" to occur by a user onboard the vehicle, a software update notification may have to be sent to the next service area that the vehicle enters. The update notification may have differing levels of importance, for example, from "urgent and mandatory" to "when convenient". The system may track when the software update was received into the database, when the software update was sent to the vehicle, and when the vehicle reported that the update has been made.

Turning to database management, an embodiment of the system may have the capability of storing multiple versions of the same software update, depending on which has been approved for which user, fleet, and vehicle. Historical information of transactions that occur for software updating may be maintained for a period of time afterwards. These retained historical records may be used for trending analysis and record keeping. The database may support separate files (with varying formats) for each of the systems onboard the vehicle. The database may support consolidated file structures (contain both program and operating system), OS file structures (just the OS), and program file structures (just the program) for the same software system. The database may support prerequisites for downloading software, including having a particular order for download for each software file of a plurality of files that may be sent to the vehicle. For instance, an OS may need to be updated first and verified to be installed before the application program may be sent. The database may have to hold images (video or data) as well as third party images and have a way for the database to be accessed from an approved source.

Instances where the back-office and hub disagree on software version, the back-office may follow what the OTA hub specifies as the software version that may be running. A handshake between the OTA hub and application may have to exist, where the application reports its version upon power-up so that the hub knows which version may be running at any given time.

In an embodiment, the application hub may maintain multiple versions of software (likely at least two) for each application so that an older version can be placed back onto the unit. The OTA hub application itself may be able to be updated by similar OTA method. For all of the applications that may be supported with the OTA download process, the OTA hub may track which version may be running on each system at any given time, so the OTA hub knows whether the updates worked correctly or not. There may never be an instance where the OTA hub does not know which OTA software version may be running on all of the applications—with any discrepancies between the OTA hub and the back-office database handled by following the version identified by the OTA hub.

A web server (or similar functionality) feature may interact with the OTA hub to help the user with any special instructions or procedures. A simple design may be targeted so that the web server and/or the OTA hub works with both a PC and a smaller device. A USB port on a Smart Display may be used by the OTA hub so that files or diagrams could be transferred to a remote data storage type device. The user interface may support wired access (plugging into a network port that is on the same network) or wireless access (over yard communications infrastructure or local vehicle hot spot). The OTA hub may support multiple steps between the user, application being updated, and the hub for user acknowledgement of steps or confirmation of specific devices being onboard the vehicle as a requirement of the update.

With reference to FIG. 1, a system overview 100 including an embodiment of the inventive subject matter described herein is shown. The system includes a locomotive 102 communicating via cell tower 104 or other off-board location with a back-office center 106. A low earth orbit satellite 108 may maintain a redundant communication pathway. The locomotive is located on a portion of railway tracks 110 or other route and is shown on approach to a switch machine 112 that controls whether the locomotive will continue on the track portion, or be transferred to a second rail path 114 at the rail junction 116. Optionally, the locomotive is another type of vehicle (e.g., a non-rail vehicle).

Figure 2:
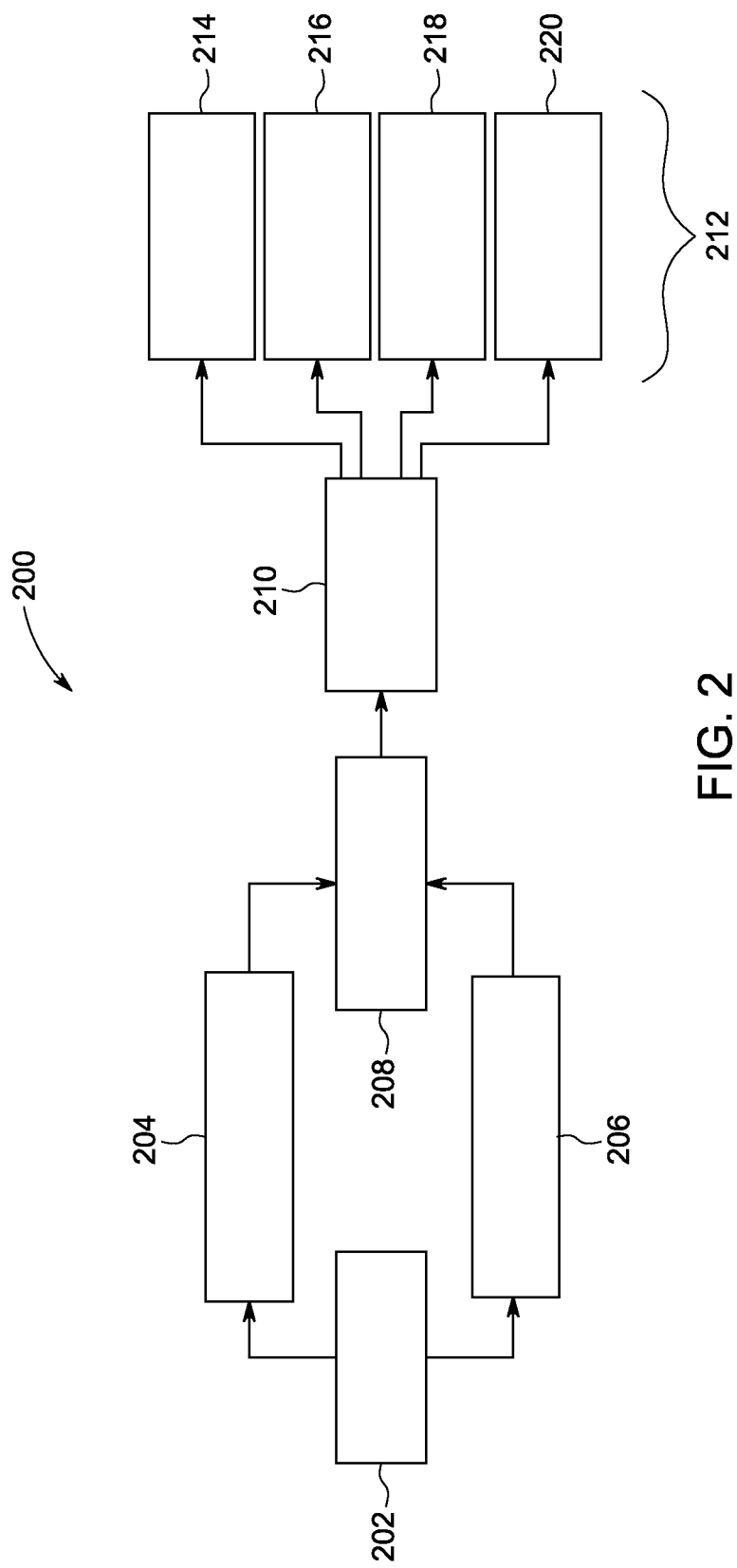
FIG. 2 is a block diagram of a system according to an embodiment of the inventive subject matter described herein.

With reference to FIG. 2, a block diagram of an OTA system architecture 200 is shown. Reference number 202 indicates a back-office and/or an ERP system that communicates with an onboard communication system 204, such as LOCOCOMM™, which is commercial available from GE Transportation (Erie, Pa.). An alternative communication path exists via a business-to-business communication link, with user owned infrastructure, as indicated by reference number 206. Regardless of the path, transmitted data flows to an onboard communication module (e.g., an ACC from GE Transportation) at reference number 208 and therethrough to the OTA hub 210. The OTA hub, then, routes the data to one or more of a plurality of applications 212. Suitable applications may include, for example, a locomotive control system 214, a fuel management system 216, a distributed power system 218, or other applications 218. Likewise, information and data can flow from the applications back through to the ERP/back-office.

Figure 3:
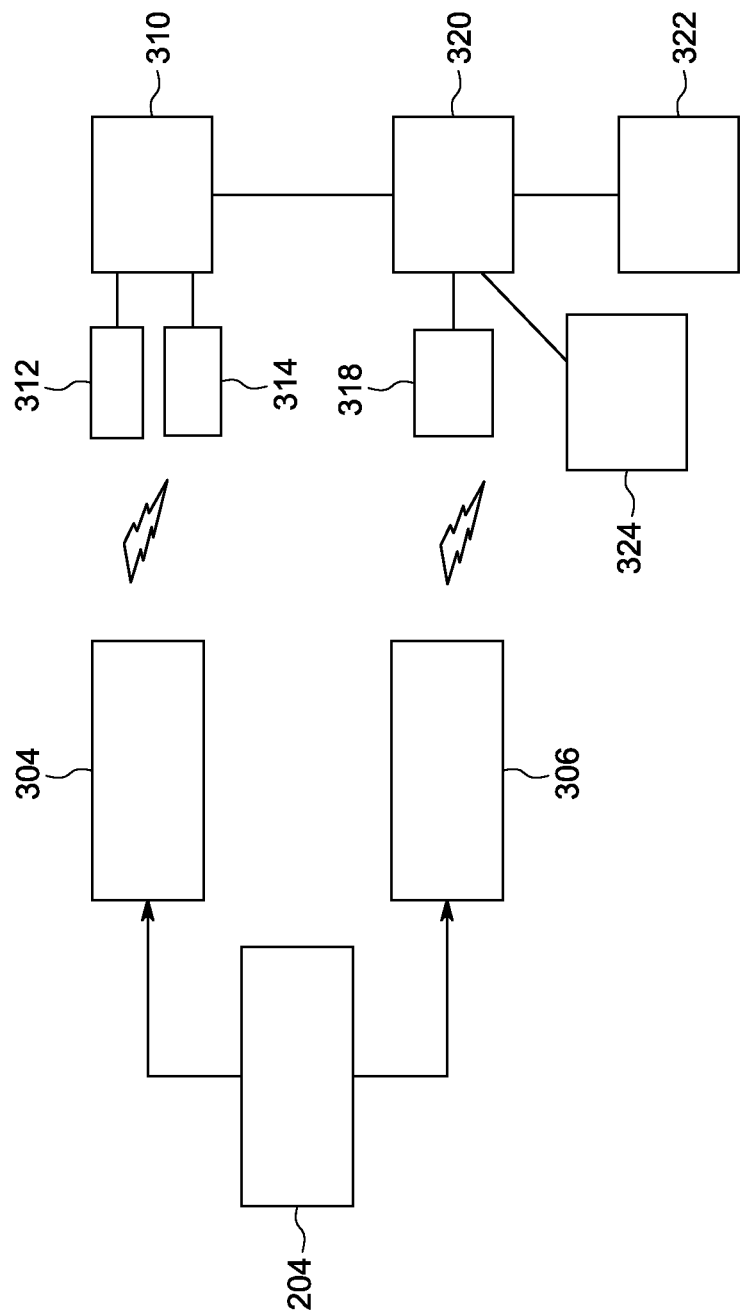
FIG. 3 is a block diagram of a system according to an embodiment of the inventive subject matter described herein.

With reference to FIG. 3, a back-office to vehicle communication system 300 is shown in block diagram form. The system of FIG. 3 differs from the system shown in FIG. 2 in that the ERP/back-office communicates through the onboard communication system 204 with the ACC 304 or through a wireless communication provider's equipment 306, which in the illustrated embodiment is a cellular network provider. The cell network and/or the ACC can then communicate with the CMU 310. The ACC can communicate directly with the CMU via Ethernet cable (not shown), or wireless via a Wi-Fi module 312, a cell module 314, or the like. The cell network can communicate with a receiver cell module 318, and through a network switch 320, through to the CMU. The CMU may include applications for blackbox recording functionality (e.g., the GE Transportation Event Recorder Automated Download (ERAD) system, RMD, video functionality (e.g., GE Transportation LocoCam system), geofencing fuel management system (e.g., GE Transportation's SmartBurn system), fuel optimization systems (e.g., GE Transportation's Trip Optimizer system), OTA hub, and general information storage and backup. A CCA 322 communicates with the network switch 320. The CCA host such functionality as the SDIS, and other auxiliary functions. The switcher can further communicate with auxiliary devices 324, such as eMU (Ethernet over multiple unit) or PTC (positive train control).

During use, the latest, known, current, intended software configuration is made available to service personnel at the time of upgrade. This configuration reflects the latest known good state of the equipment and the new configuration. In an embodiment, the hub maintains a configuration of the software and pending work instructions. The hub can receive the new configuration, work instructions and software update from a remote location and can store the new configuration, work instructions, and software update until all necessary components are available and synchronized, and the equipment is in a state to receive the update. The work instructions can be displayed on the interface component, which may be a physically attached display, a remote display, or a wirelessly coupled display.

In an embodiment, the hub receives the data wirelessly during use. The update software may be downloaded prior to the updating event by any of: a memory device, another mobile asset with a same or similar configuration, or wirelessly through a communication system. If another asset is used, the hub matches the requirements of its equipment to the configuration of the other asset, and then can clone the other asset's configuration and software to itself.

Service personnel may check the update status and may acknowledge the success or failure of the update. This information is transmitted back to the back-office for record keeping. This addresses configuration control by providing adequate synchronization to reduce errors.

In case of upgrade failure, the presence of the previously known good state permits reversion and continued operation of the equipment. In an embodiment, the back-office notifies the service shop or operator of asset malfunction. This facilitates material scheduling pending availability of correct software updates, repair parts, or labor availability. When the mobile asset enters the service facility, the mobile asset can communicate with a service manager to confirm personnel and material availability and provide the current state and upgrade options/requests of the mobile asset. Personnel can be dispatched with the appropriate communication devices, repair parts, and software updates if local connectivity is not available wirelessly. Repairs may be performed in locations with limited or no connectivity to the common data center because the mobile device should be loaded out with the necessary software updates for manual install. If the service program cannot complete or must be interrupted, the partially upgraded configuration is maintained by the hub and transmitted to the back office. Subsequent updates can pick up where the installation left off.

Where a scheduled mobile device upgrade is superseded by a revised version, the hub may cancel the previously scheduled update at any time, for example prior to service or repair work being performed and wait until the new configuration and update is available, complete and validated. In an embodiment, during inspection a specific re-synchronization may be performed to ensure that the latest scheduled service program is applied.

The hub may reduce software download delays; enhance the synchronization of configuration, software and service programs; preschedule repair materials or service personnel; reschedule service action based on service shop load and material availability; enable reversion to last known good state with data being held locally; perform software updates without the need to receive data from a back-office or to carry a data device; assure that only authorized service is performed; adapt to the data paths and infrastructure available; and control configuration on an asset-by-asset basis.

As an additional feature, the hub onboard the vehicle may optimize the installation process. Removal of unneeded install steps or reboots may save on down time of the equipment. The approach presented facilitates the latest known current and intended configuration being made available to the service personnel at the time of upgrade as well as any software or hardware prerequisites required for the intended configuration change. This reflects the latest know good state of the machine to be serviced as well as the new intended state.

Figure 4:
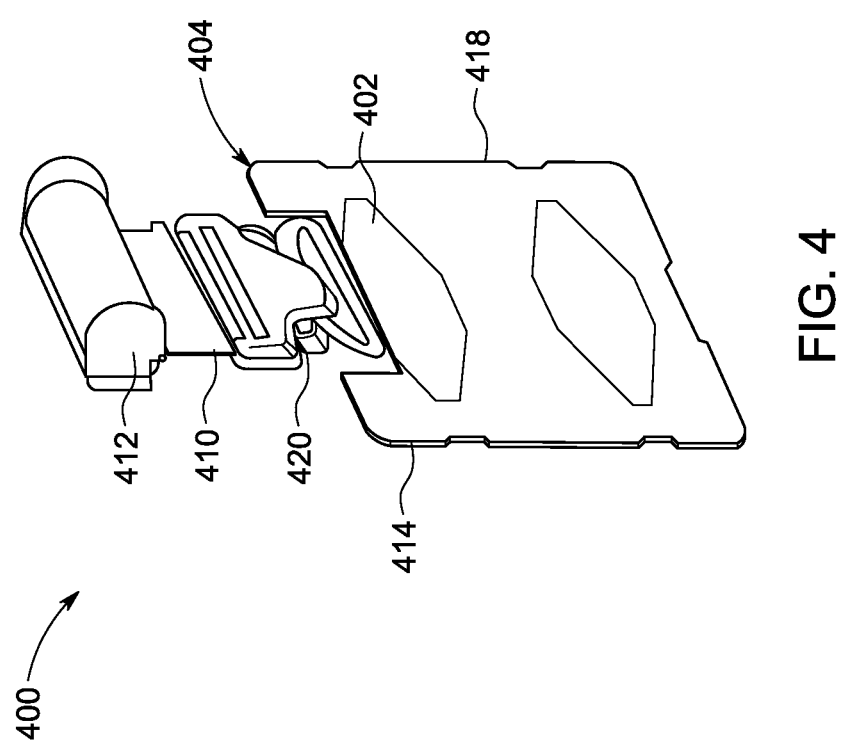
FIG. 4 is a graphical representation of an embodiment of the inventive subject matter described herein.

FIG. 4 is a schematic representation of a portable interface system 400 that includes an interface component 402 and a component carrier 404. Suitable interface component hardware may include a smart device (tablet or phone) that is wirelessly enabled. The component can be disposed in the carrier when not in use, or during use in some instances. The carrier can be secured to clothing or equipment using a clip (not shown) and includes a wide web 410, a retractor 412, and a case 414. The web can be biased to roll into the retractor for storage. The case can include a cover flap 418, which can be removed for ease of access, secured so as to allow access to a screen surface thereof, or which can be closed to protect the component from impact and ambient elements. A detachable clip 420 secures the case to the web.

Figure 5:
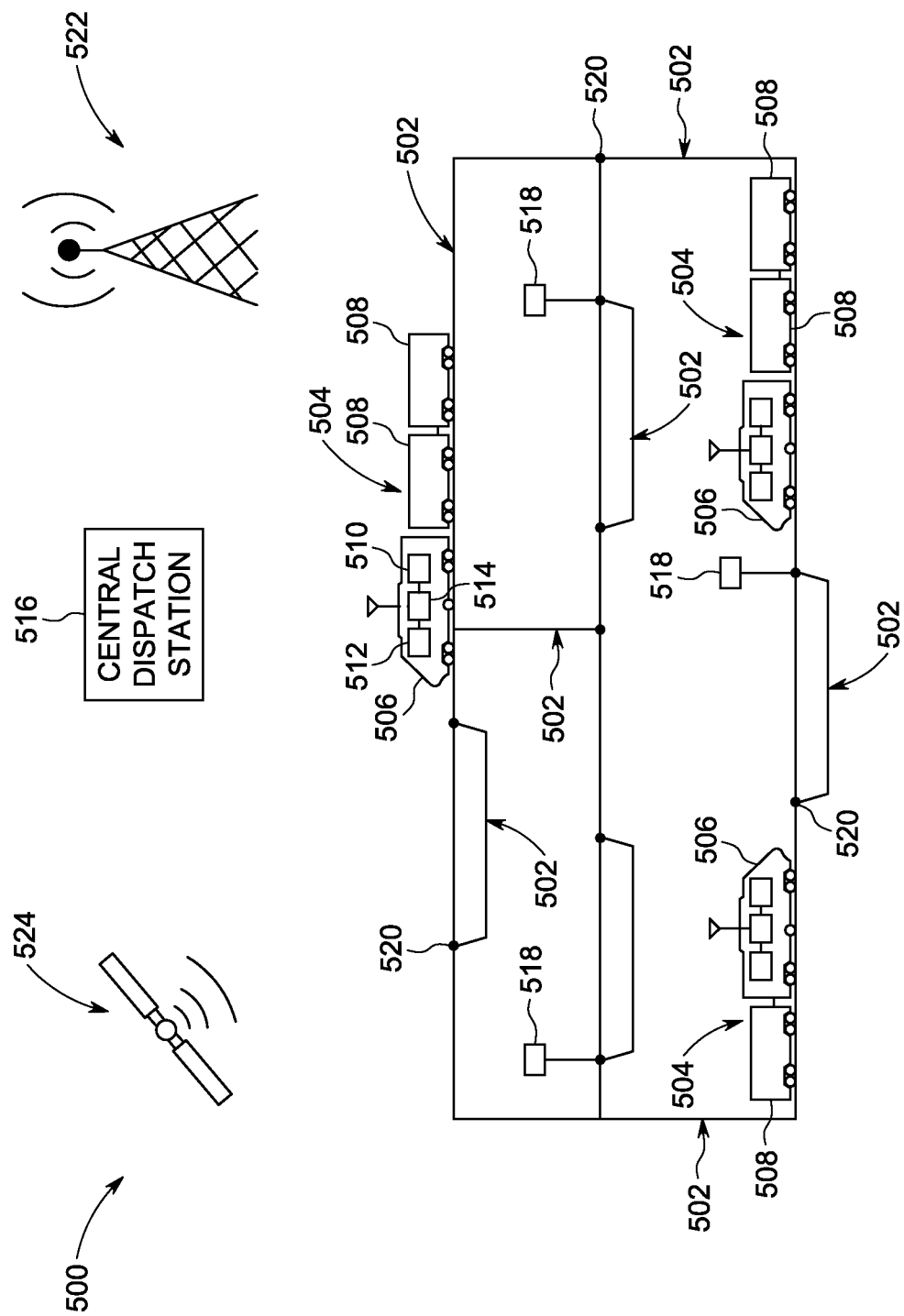
FIG. 5 is a schematic view of a transportation network according to an embodiment of the inventive subject matter described herein.

FIG. 5 is a schematic view of a transportation network 500 according to an embodiment of the inventive subject matter described herein. The transportation network 500 includes a plurality of interconnected routes 502. In the illustrated embodiment, the routes 502 represent tracks (such as, but not limited to, railroad tracks and/or the like) that rail vehicles travel across. The transportation network 500 may extend over a relatively large area, such as hundreds of square miles or kilometers of land area. The number of routes 502 shown in FIG. 5 is meant to be illustrative and not limiting on embodiments of the subject matter described herein. Moreover, while one or more embodiments described herein relate to a transportation network formed from rail tracks, not all embodiments are so limited. Rather, in addition or alternative to the rail tracks, the transportation network may be formed by any other structure, pathway, and/or the like, such as, but not limited to, roads, highways, interstates, flight paths through airspace, waterways, and/or the like.

Plural separate vehicles 504 travel along the routes 502. In the illustrated embodiment, the vehicles 504 are shown and described herein as rail vehicles and/or rail vehicle consists. However, one or more other embodiments may relate to vehicles other than rail vehicles and/or rail vehicle consists. For example, the vehicles 504 may represent other off-highway vehicles, on-highway vehicles such as automobiles (e.g., cars, busses, and the like), marine vessels, airplanes, and/or the like. A vehicle 504 may include one or more powered vehicles 506 (referring to rail vehicles configured for self propulsion, e.g., locomotives and/or the like). A vehicle 504 may include one or more non-powered vehicles 508 (referring to rail vehicles not configured for self propulsion, e.g., cargo cars, passenger cars, and/or the like) that are mechanically coupled or linked together to travel along the routes 502.

Each powered vehicle 506 includes a propulsion subsystem 510 that propels the powered vehicle 506. The propulsion subsystem 510 may include one or more traction motors, brakes, and/or the like that provide tractive effort to propel the corresponding vehicle 504 along the routes 502 and provide braking efforts to slow or stop movement of the vehicle 504. The powered vehicles 506 include various software applications, such as, but not limited to, movement control systems 512 that control movement of the vehicles 504 along the routes 502. For example, the movement control systems 512 may control various functions of the propulsion systems 510. In the illustrated embodiment, the movement control systems 512 are locomotive control systems. The powered vehicles 506 and/or the non-powered vehicles 508 may include various other software applications, such as, but not limited to, fuel management systems that manage the amount of fuel consumed by the vehicles 504, distributed power systems that distribute tractive efforts and braking efforts between different powered vehicles 506, navigation systems, energy management systems, fuel injection systems, black box and/or other log recording applications, RMD systems, video functionality, fuel optimization systems, and/or the like.

The vehicles 504 may include display devices 514 that visually present movement control instructions and/or other parameters to the operator onboard the vehicle 504. For example, a computer monitor or display screen may present settings for a throttle and/or brake setting of the propulsion subsystem 510. The settings may prompt the operator to change the tractive effort and/or braking effort of the propulsion subsystem 510. Alternatively, the control instructions may be communicated to the propulsion subsystem 510 from the movement control system 512 to automatically control the tractive effort and/or braking effort of the propulsion subsystem 510. For example, the propulsion subsystem 510 may receive an updated throttle and/or brake setting from the movement control system 512 and modify the tractive effort or braking effort in response thereto.

The transportation network 500 includes a central dispatch station 516 that controls movement of the vehicles 504 along the routes 502 of the transportation network 500. As shown in FIG. 5, the central dispatch station 516 is disposed off-board (e.g., outside) the vehicles 504 at a location that is remote from the vehicles 504 as the vehicles travel along the routes 502 of the transportation network 500. The transportation network 500 may include one or more signaling devices 518 (e.g., stop signs, signaling lights, caution and/or other warning signs, and/or the like) for controlling the flow of traffic of the vehicles 504 along the routes 502. The transportation network 500 may include one or more switching devices 520 that enable the vehicles 504 to transfer between different routes 504 (i.e., between different railroad tracks). The central dispatch station 516 may include an enterprise resource planning (ERP) system. The central dispatch station 516 is sometimes referred to, and may be referred to herein, as a "back-office" and/or an "ERP system". The central dispatch station 516 may also be referred to herein as a "remote location".

The vehicles 504 are communicatively connected to the central dispatch station 516 such that the vehicles 504 and the central dispatch station 516 can communicate with each other. For example, the powered vehicles 506 may be communicatively connected to the central dispatch station 516 for communicating therewith. The vehicles 504 and the central dispatch station 516 may communicate with each other using any type of communication and using any type of communications equipment. For example, the vehicles 504 and the central dispatch station 516 may communicate wirelessly over a wireless network, such as, but not limited to, using radio frequency (RF), over a cellular network, over a satellite network, and/or the like. In some embodiments, two or more separate wireless networks are provided to provide two or more redundant wireless communications pathways between the vehicles 504 and the central dispatch station 516. For example, in the illustrated embodiment, the transportation network 500 is configured such that the vehicles 504 and the central dispatch station 516 can communicate with each other over both a cellular network 522 and a satellite network 524 that is separate from the cellular network 522. As used herein, a "satellite network" refers to a wireless network that uses one or more satellites to relay communications between the vehicles 504 and the central dispatch station 516. It should be understood that a satellite network may include any number of satellites, including only one satellite. Moreover, the cellular network 522 may alternatively be any other type of wireless network.

In addition or alternatively to communicating over one or more wireless networks, the vehicles 504 and the central dispatch station 516 may communicate over the Internet, an at least partially wired intranet, a network communication cable, a telephone cable, and/or the like. In some embodiments, two or more separate wired networks are provided to provide two or more redundant wired communications pathways between the vehicles 504 and the central dispatch station 516. Moreover, the transportation network 500 may include both a wired network and a separate wireless network to provide at least two redundant communications pathways between the vehicles 504 and the central dispatch station 516. It should be understood that in addition or alternatively to one or more wireless networks and one or more wired networks, the vehicles 504 and the central dispatch station 516 may communicate with each other over a single network that includes both wireless pathways and wired pathways.

Figure 6:
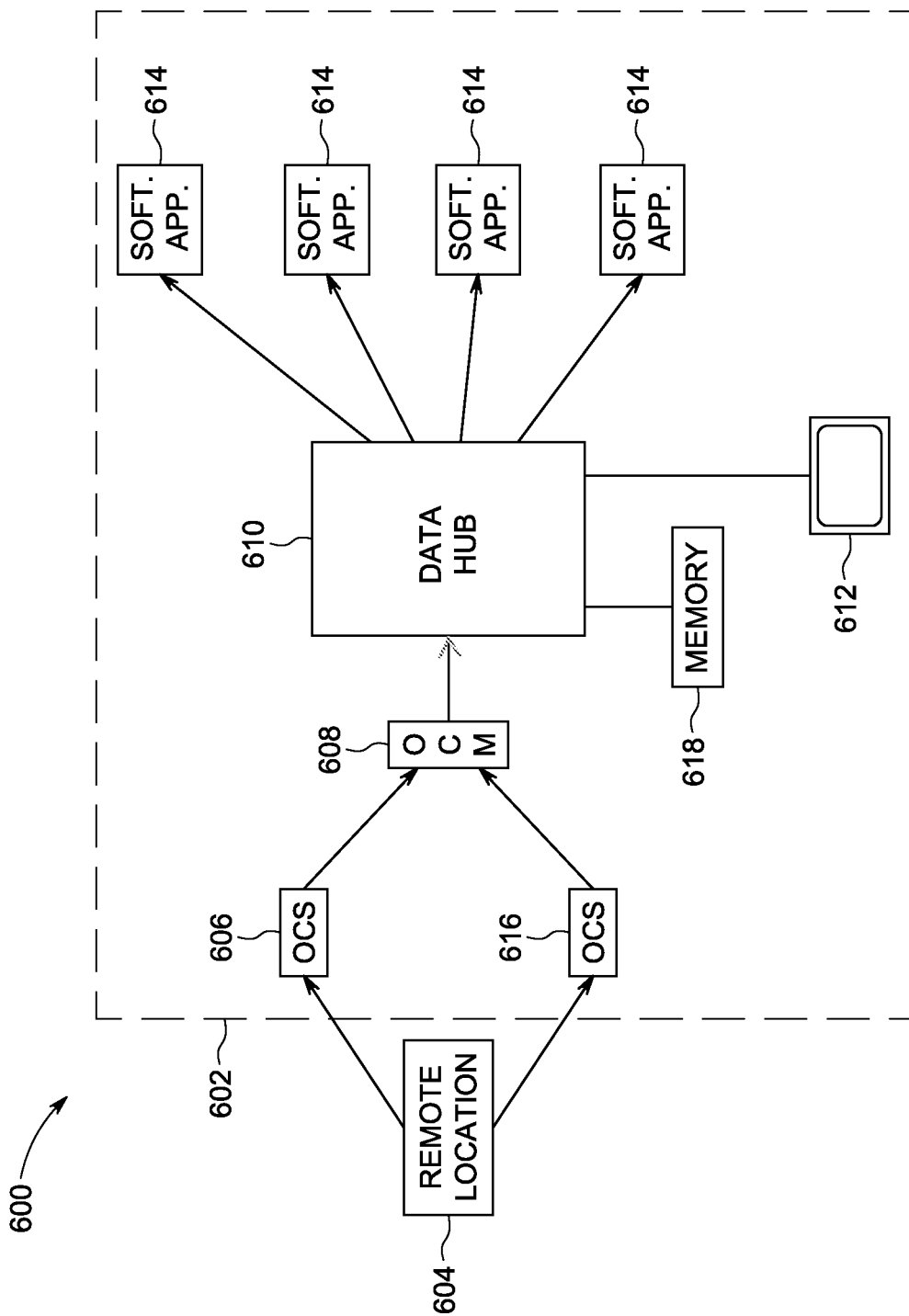
FIG. 6 is a block diagram of a system according to an embodiment of the inventive subject matter described herein.

FIG. 6 is a block diagram of a system 600 according to an embodiment of the inventive subject matter described herein. The system 600 includes an asset 602 and a remote location 604. In an exemplary embodiment, the asset 602 is one of the rail vehicles 504 (shown in FIG. 5) and the remote location 604 is the central dispatch station 516 (shown in FIG. 5) of the transportation network 500 shown in FIG. 5. But, as described above, the asset 602 may alternatively be any other type of mobile or stationary asset, such as, but not limited to, a mobile electronic device, a stationary electronic device, a marine vessel, an aircraft, another off-highway vehicle, an on-highway vehicle, an automobile, mining equipment, a wind turbine, a signaling device, an electrical power generator, and/or the like. Moreover, the remote location 604 may alternatively be another type of entity besides a central dispatch station. For example, the remote location may be a remote server that is configured to distribute software updates to (and optionally distribute other data to and/or receive other data from) an asset 602 that is a stationary or mobile electronic device. Moreover, and for example, the remote location may be a central controller that is configured to control various functions of, distribute software updates to, distribute other data to, and/or receive other data from an asset 602 that is a vehicle and/or a piece of equipment (such as, but not limited to, mining equipment, a wind turbine, a signaling device, an electrical power generator, and/or the like).

The asset 602 includes an onboard communication system (OCS) 606, an onboard communication module (OCM) 608, a data hub 610, one or more displays 612, and one or more software applications 614. The OCS 606 is communicatively connected to the remote location 602 for communicating with the remote location 602. The OCS 606 may be any type of communication system that is configured to communicate with the remote location 602. In an exemplary embodiment, the OCS 606 is LOCOCOMM™, which is commercial available from GE Transportation of Erie, Pa. The asset 602 optionally includes one or more other OCSs 616 to provide redundancy. The OCS 616 may be any type of communication system that is configured to communicate with the remote location 602. In an exemplary embodiment, the OCS 616 is a business-to-business communication link with user owned infrastructure.

Each of the OCSs 606 and 616 may communicate with the remote location 604 using any type of communication and using any type of communications equipment. For example, the OCS 606 may communicate with the remote location 604 over a wired network (such as, but not limited to, the Internet, an at least partially wired intranet, a network communication cable, a telephone cable, and/or the like) or wirelessly over a wireless network (such as, but not limited to, using radio frequency (RF), over a cellular network, over a satellite network, and/or the like). Similarly, the OCS 616 may communicate with the remote location 604 over a wired network or wirelessly over a wireless network, whether or not the OCS 616 uses the same type (i.e., wireless or wired) of network. In some embodiments, the OCS 606 and/or the OCS 616 communicates with the remote location 604 over a single network that includes both wireless pathways and wired pathways.

The data hub 610 is configured to communicate with the remote location 604 through the OCM 608 and the OCSs 606 and 616. Specifically, the OCM 608 is operatively connected between the data hub 610 and the OCS 606 such that a first communication path is defined from the remote location 604, through the OCS 606 and the OCM 608, to the data hub 610, and vice versa. The OCM 608 is also operatively connected between the data hub 610 and the OCS 616 such that a second communication path is defined from the remote location 604, through the OCS 616 and the OCM 608, to the data hub 610, and vice versa. In an exemplary embodiment, the OCM 608 is an ACC, which is commercially available from GE Transportation of Erie, Pa. But, the OCM 608 may be any other type of communication module that is capable of routing communications between the data hub 610 and an OCS (e.g., the system 606 and the system 616).

The data hub 610 is optionally located onboard the asset 602. In other words, in an embodiment, the data hub 610 is integrated as a component of the asset 602. Alternatively, the data hub 610 is a physically separate device from the asset 602 that is operatively connected to the asset 602. Generally, the data hub 610 is configured to manage updating of the software applications 614 of the asset 602, as will be described below. The data hub 610 may be embodied in a software application, a computer, a computer processor, a microcontroller, a microprocessor, and/or other logic-based device and/or application, that operates based on one or more sets of instructions (e.g., software) stored on a tangible and non-transitory computer readable storage medium (e.g., hard drive, flash drive, ROM, or RAM), for example of the asset 602. The data hub 610 may be referred to herein as an "OTA hub" and/or as an "interface component". For example, the data hub 610 may be the OTA hub 210 shown in FIG. 2.

The data hub 610 is operatively connected to the software applications 614 of the asset 602 for managing updating of the software applications 614. Each software application 614 may be any type of software application, such as, but not limited to, an operating system, a vehicle control system, an equipment control system, a business application, an entertainment application, and/or the like. The asset 602 may include any number of software applications 614. Each software application 614 of the asset 602 may be written for any software standard (e.g., an operating system standard, a programming language standard, and/or the like). The asset 602 may have any number of different software applications 614 that are written for any number of different software standards. The data hub 610 may therefore be configured to manage software updates across a variety of different software standards.

In an exemplary embodiment where the asset 602 is a rail vehicle (e.g., a rail vehicle 504 shown in FIG. 5), the software applications 614 include a locomotive control system, a fuel management system, a distributed power system, and a blackbox recording application. Optionally, the data hub 610 includes one or more of the software and/or hardware components of one or more of the software applications 614. For example, the data hub 610 may include the operating system and/or one or more software programs of a software application 614. In some embodiments, the data hub 610 includes the software components of all of the software applications 614.

The display 612 is located onboard the asset 602 and is configured to visually present data, parameters, other information, and/or the like that is related to the asset 602. For example, in an embodiment wherein the asset 602 is a mobile electronic device, the display 612 may display video played by the asset 602, may display a user interface, may display settings and/or other parameters of the asset 602, may display a software application that is running on the asset 602, and/or the like. Moreover, and for example, in an embodiment wherein the asset 602 is or includes a powered rail vehicle, the display 612 may display, among other things, movement control instructions and/or other parameters to the operator onboard the rail vehicle.

The display 612 is operatively connected to the data hub 610 for displaying data related to the updating of the software applications 614 onboard the asset 602, as will be described below. For example, as is described below, the display 612 may display a current configuration file and an updated configuration file onboard the asset 602. In some embodiments, the display 612 is a component of the asset 602 that is permanently located (at least until replaced) on-board the asset 602. For example, the display 612 may be a permanent (at least until replaced) display that is located within the cab of an asset 602 that is a vehicle. Moreover, and for example, the display 612 may be, or form a component of, the user interface of an asset 602 that is a mobile or stationary electronic device. But, in some embodiments, the display 612 is not a component of the asset 602, but rather is a discrete display that is removably connected to the data hub 610 by an operator for an update of a software application of the asset 602.

The asset 602 may include one or more memories 618 and/or other storage devices for storing various data related to the asset 602, as will be described below. For example, as is described below, the memory 618 may enable the data hub 610 to store configuration files, service programs, and software updates that relate to one or more of the software applications 614. Each memory 618 and/or other storage device of the asset 602 may be a dedicated memory of the data hub 610 or may be a discrete component from the data hub 610 that is operatively connected to the data hub 610 for storing data therefrom.

Operation of the data hub 610 will now be described. As briefly described above, the data hub 610 is configured to manage updates to the software applications 614. The data hub 610 is configured to store, and therefore includes, a current configuration file for each of the software applications 614. The current configuration file of each software application 614 indicates a current configuration state of the software application 614. As used herein, the "current" configuration state of a software application 614 represents the software and hardware components of, or associated with, the software application 614 that are currently functional on the asset 602. The current configuration state of a software application 614 therefore represents the latest version of the software application 614 that has been functioning on the asset 602. The current configuration file of each software application 614 may include any data for indicating the current configuration state of the software application 614. For example, the current configuration file of each software application 614 may include, among other things, an indication of a current version of the software application 614 overall, an indication of a current version of an operating system of the software application 614, an indication of a current version of a software program of the software application 614, a current software architecture of the software application 614, a list of one or more hardware components of the asset 602 that are currently associated with the software application 614, a current architecture of hardware associated with the software application 614, a log that indicates updates that have been applied to one or more software applications 614 and/or indicates updates that have not been applied to one or more of the software applications 614.

The data hub 610 is configured to update the software applications 614, which as described below may be manually performed by an operator and/or may be automatically performed by the data hub 610. The data hub 610 may be configured to update the software applications 614 across a variety of different software standards. The data hub 610 is configured to receive, from the remote location 604, a new configuration file, a service program, and one or more software updates of one or more of the software applications 614. Each software update is an intended software update to the operating system or a software program of the software application 614.

The new configuration file of a software application 614 indicates an updated configuration state of the software application 614 with the software update(s). As used herein, the "updated" configuration state of a software application 614 represents the software and hardware components of, or associated with, the software application 614 that may be updated in accordance with the software update(s). As used herein, the phrase "updated in accordance with the software update(s)" includes applying the software update(s) to the operating system and/or software program(s) of the software application 614, and may include making software and/or hardware updates to accommodate the software update(s).

The updated configuration state of a software application 614 may represent the latest version of the software application 614 that is available from the developer and/or provider of the software application 614. Alternatively, a later version of the software application 614 may exist but the updated configuration state represents an intermediate version (between the current version and the latest version) of the software application 614. The updated configuration file of a software application 614 may include any data for indicating the updated configuration state of the software application 614. For example, the updated configuration file of a software application 614 may include, among other things, an indication of an updated version of the software application 614 overall, an indication of an updated version of an operating system of the software application 614, an indication of an updated version of a software program of the software application 614, an updated software architecture of the software application 614, an updated list of one or more hardware components of the asset 602 that are currently associated with the software application 614, an updated architecture of hardware associated with the software application 614, a log that indicates updates that have been applied to one or more of the software applications 614 and/or indicates updates that have not been applied to one or more of the software applications 614, and/or the like.

The service program of a software application 614 includes work instructions that instruct how to apply the updated configuration state to the software application 614. As will be described below, each step of the work instructions may be performed automatically by the data hub 610 or may be performed manually by an operator. The work instructions may include any data that is instructive as to how to apply the updated configuration state to the software application 614. For example, the work instructions include one or more steps that must be completed to apply the software update(s) to the operating system and/or software program(s) of the software application 614. The work instructions may also include one or more steps that must be completed to update the software architecture of the software application 614, for example to accommodate the software update(s). For example, the work instructions may include one or more steps that instruct a rearrangement of software components of the software application 614 relative to each other.

In some embodiments, the work instructions include one or more steps that must be completed to change the hardware components and/or the hardware architecture associated with the software application 614, for example to accommodate the software update(s). For example, the work instructions may include one or more steps that instruct that one or more hardware components associated with the software application be serviced, replaced, and/or updated. Moreover, and for example, the work instructions may include one or more steps that instruct a rearrangement of hardware components relative to each other and/or relative to the software components of the software application 614. The work instructions of the service program are not limited to the exemplary steps described herein. Rather, the work instructions may include any other steps for instructing how to apply the updated configuration state to the software application 614. Moreover, the work instructions may include steps that do not relate to the application of the software update(s) to the software components of the software application 614, but that rather relate to regular service and/or maintenance of the software and/or hardware components of, or associated with, the software application 614. Any steps of the work instructions that do not relate to the application of the software update(s) to the software components of the software application may be considered as components of the updated configuration state of a software application 614.

Each set of work instructions and each service program is not limited to a single software application 614. Rather, a service program and/or the work instructions thereof may apply to the software updates of two or more different software applications. In other words, a service program may include work instructions that have steps that instruct how to apply updated configuration states to two or more different software application 614. In some embodiments, a service program includes work instructions that have steps that instruct how to apply updated configuration states to two or more different software applications 614 that have different software standards.

The data hub 610 may receive the new configuration file, the service program, and the software update(s) of a software application 614 using a pull process, where the data hub 610 initiates reception, and/or using a push process, where the remote location 614 initiates the transmission of the new configuration file, the service program, and the software update(s) to the data hub 610. Optionally, the data hub 610 automatically receives the new configuration file, the service program, and the software update without prompting a user to accept the new configuration file, the service program, and software update(s). In other words, the data hub 610 may automatically receive the new configuration file, the service program, and the software update(s) without any input (e.g., a decision) from the user. As used herein, a "user" is intended to mean a user of the asset 602 and/or service personnel that at least partially performs the update, that supervises the update, and/or that is present at the asset 602 when the data hub 610 receives the new configuration file, the service program, and the software update(s).

In some embodiments, the data hub 610 automatically receives the new configuration file, the service program, and the software update(s) when the asset 602 enters a service location where the asset 602 is intended to be serviced. Such servicing of the asset 602 may include updating the configuration state of the software application 614 to the updated configuration state and/or may include other service that is not related to updating the software application to the updated configuration state. The data hub 610 may automatically receive the new configuration file, the service program, and the software update(s) at a scheduled reception time, whether scheduled by the data hub 610 or the remote location 604. Moreover, the data hub 610 may automatically receive the new configuration file, the service program, and the software update(s) when instructed by the remote location 604 or at a time determined by the data hub 610. For example, the data hub 610 may request the new configuration file, the service program, and the software update(s) of a software application 614 at regular or irregular intervals of time determined by, or programmed into, the data hub 610.

After receiving the new configuration file, the service program, and the software update(s) of a software application 614, the data hub 610 may store (e.g., using the memory 618) the new configuration file, the service program, and the software update(s) for a period of time before updating the software application 614 with the updated configuration state of the new configuration file. For example, software application 614 may not be available for updating at the time of reception of the new configuration file, the service program, and the software update(s). Accordingly, the data hub 610 may be configured to store the new configuration file, the service program, and the software update(s) until the software application 614 is available to be updated. By not being "available", it is meant that a software application cannot be updated, for example because the software application is currently running and is therefore busy.

The data hub 610 may be configured to store the new configuration file, the service program, and the software update(s) until the data hub 610 receives verification (e.g., from the remote location 604 or from a service location) that the updated configuration state is a currently intended version of the software application 614. As used herein, a "currently intended version" of a software application is the version that the developer and/or provider of the software application currently intends to be used. The currently intended version may be the latest version of the software application 614 that is available from the developer and/or provider of the software application 614. Alternatively, the currently intended version may an intermediate version, for example in circumstances wherein the latest version is not compatible with the asset 602 (e.g., not compatible with one or more hardware components of the asset 602 and/or one or more other software applications 614 of the asset 602).

The data hub 610 may be configured to store the new configuration file, the service program, and the software update(s) until the data hub 610 receives verification (e.g., from the remote location 604 or from a service location) that the updated configuration state is compatible with the current configuration state of the software application 614 and/or is compatible with one or more other software applications 614 of the asset 602. By being compatible with the updated configuration state of the software application 614, it is meant that the current configuration state is capable of being updated with the updated configuration state without causing the software application 614, any hardware components of the asset 602, and/or one or more other software applications 614 of the asset to malfunction and/or fail. In some embodiments, the data hub 610 is configured to store (e.g., using the memory 618) two or more different configuration files (e.g., an older version and a newer version, whether either is the current version) of a software application 614 of the asset 602.

The data hub 610 may be configured to display the current configuration file and the new configuration file onboard the asset 602, for example using the display 612. Displaying the current configuration file and the new configuration file of one or more software applications 614 onboard the asset 602 ensures that the latest known current configuration state and the latest known currently intended configuration state of the software application 614 is presented to the operator, for example at the time of the application of a software update. The data hub 610 may be configured to display the work instructions and/or other components of a service program onboard the asset 602, for example at the time of the application of a software update. Display of the work instructions and/or other components of a service program onboard the asset 602 may guide an operator through the steps that must be completed by the operator to apply one or more software updates to one or more software applications and/or may enable an operator to monitor and/or verify steps that are being performed by the data hub 610.

The data hub 610 is configured to update at least some of the software applications 614 of the asset 602 with the received updated configuration states according to the work instructions of the received service programs. Updating a software application 614 with an updated configuration state may include applying the corresponding software update(s) to an operating system and/or a software program of the software application 614 that is being updated. Updating a software application 614 with an updated configuration state may include applying a software architecture change, applying a hardware architecture change, removing a hardware component, replacing a hardware component, updating a hardware component, and/or the like. Moreover, updating a software application 614 with an updated configuration state may include updating the current configuration file of the software application 614 to the updated configuration state or may include replacing the current configuration file with the new configuration file.

The steps required to apply an updated configuration state to each software application 614 may be performed by automatically by the data hub 610 and/or may be performed manually by an operator. For example, all of the steps of the work instructions that are required to update a particular software application 614 of the asset 602 to an updated configuration state may be performed by the data hub 610 or may be performed manually by an operator. Moreover, and for example, some of the steps of the work instructions that are required to update a particular software application 614 of the asset 602 to an updated configuration state may be performed by the data hub 610 while other steps of the work instructions are performed manually by an operator.

Any steps of the work instructions that are performed by the data hub 610 are optionally performed automatically by the data hub 610 without prompting a user (e.g., the operator) to acknowledge, accept, authorize, approve, and/or the like the step(s) before the step(s) is performed. For example, the data hub 610 may be configured to automatically update a particular software application 614 of the asset 602 without prompting a user by automatically initiating and performing all of the steps required that are to update the software application 614 to the updated configuration state without prompting the user. Moreover, and for example, the data hub 610 may just automatically initiate an update of a particular software application 614 of the asset 602 to an updated configuration state without prompting a user. For example, the data hub 610 may be configured to automatically initiate the steps required to update the software application 614 to the updated configuration state without prompting the user, wherein the steps may be subsequently performed manually by the user and/or automatically the data hub 610.

The data hub 610 may be configured to automatically initiate, without prompting a user, an update of a software application 614 to an updated configuration state (whether or not any subsequent steps of the work instructions are performed manually by the operator): upon reception of a new configuration file, a service program, and/or a software update; at a scheduled time after reception of a new configuration file, a service program, and/or a software update; once the corresponding software application 614 is available to be updated; upon verification that the updated configuration state is a latest version of the software application 614, and/or upon verification that the updated configuration state is compatible with the current configuration state of the software application 614 and/or is compatible with one or more other software applications 614 of the asset 602. Moreover, the automatic initiation of an updated configuration state by the data hub 610 may be based on the availability of personnel, hardware, and/or service capability (e.g., the capability of performing one or more steps of the work instructions and/or other components of the service program, for example at a particular service location), for example personnel, hardware, and/or service capability that may be necessary to complete the update of the software application 614 and/or regular service and/or maintenance of the software and/or hardware components of, or associated with, the software application 614. For example, the data hub 610 may automatically initiate the application of an updated configuration state upon personnel, hardware, and/or service capability becoming available, for example at a particular service location. As should be understood from the above description of the work instructions and the updated configuration state, the automatic initiation of an updated configuration state by the data hub 610 may include the automatic initiation of regular service and/or maintenance of the software and/or hardware components of, or associated with, a software application 614.

As described above, the data hub 610 is configured to manage the updates of a plurality of the software applications 614 of the asset 602 to corresponding updated configuration states. In other words, the data hub 610 is configured to receive and apply updated configuration states to a plurality of the software applications 614 of the asset 602. In some embodiments, the data hub 610 is configured to manage the updates of all of the software applications 614 of the asset 602. As is also described above, the various software applications 614 of the asset 602 may be written for various different software standards. Accordingly, the data hub 610 is configured to receive and apply updated configuration states of software applications 614 of the asset 602 across a variety of different software standards.

Once an updated configuration state has been successfully applied to a software application 614, the data hub 610 may be configured to record and store a log (e.g., using the memory 618) that indicates that the particular software application 614 has been successfully updated to the updated configuration state. Optionally, a log of the data hub 610 that indicates that a particular software application 614 has been successfully updated to an updated configuration state may include similar records for other software applications 614 of the asset 602. Alternatively, the data hub 610 may record separate logs for different software applications 614. Optionally, a log of the data hub 610 may include a historical record of updates that have and/or have not been applied to the software application(s) 614 associated with the log. Accordingly, the data hub 610 may include one or more logs that contain an update history of one or more software applications 614 of the asset 602. Such an update history may include updated configuration states that were not applied to a software application 614 as well as any reasons that the updated configuration state was not applied. The data hub 610 may be configured to transmit the log and/or another acknowledgment that the software application 614 has been successfully updated to the updated configuration state to the remote location 604.

In some circumstances, an updated configuration state is not successfully applied to a software application 614 of the asset 602. For example, the software application 614 may fail to function or may function improperly once the updated configuration state has been applied thereto. Moreover, and for example, the software application 614, one or more hardware components of the asset 602, and/or one or more other software applications 614 of the asset 602 may prevent the updated configuration state from being successfully applied. The data hub 610 may be configured to revert back to the current configuration state of a software application 614 upon failure of the successful application of an updated configuration state to the software application 614. The data hub 610 may additionally or alternatively be configured to cancel or postpone an update of a software application 614 to an updated configuration state based on a level of criticality of the update as compared to a level of criticality of an update of one or more other software applications 614 of the asset 602. The log(s) of the data hub 610 described above may be used to record the unsuccessful application of an updated configuration state, the reversion back to the current configuration state, and/or the canceling or postponing of an update. The data hub 610 may be configured to transmit the log and/or another acknowledgment of such events to the remote location 604. The level of criticality between two or more updates may be determined by various factors, such as, but not limited to, a relative importance between the updates, a compatibility of the updates relative to each other and/or other updates, and/or the like.

As described above, the data hub 610 is configured to manage the updates of a plurality of the software applications 614 of the asset 602 to corresponding updated configuration states. The data hub 610 may be configured to automatically reorder and/or cancel the application of an updated configuration state to one or more of the software applications 614 based on one or more factors, such as, but not limited to, supercession of an updated configuration state by another (e.g., newer, more compatible, and/or the like) configuration state, a comparison of a level of criticality of two or more updated configuration states, a compatibility between two or more software applications, and/or the like. The automatic reordering and/or cancellation functionality of the data hub 610 may reduce the amount of down time experienced by the asset 602, for example during service. In an embodiment, the data hub 610 is configured to automatically at least one of reorder application of first and second updated configuration states to first and second software applications 614, respectively, or cancel application of one of the first or second updated configuration states to the first and second software applications 614, respectively. In an embodiment, the data hub 610 is configured to automatically (i) in a first mode of operation, reorder application of first and second updated configuration states to first and second software applications 614, respectively, and (ii) in a second mode of operation, cancel application of one of the first or second updated configuration states to the first and second software applications 614, respectively.

For example, the data hub 610 may be configured to automatically cancel application of an updated configuration state to a software application 614 of the asset 602 based on a supercession of the updated configuration state by another (e.g., newer, more compatible, and/or the like) updated configuration state of the software application 614. Moreover, and for example, the data hub 610 may be configured to automatically reorder the application of two or more updated configuration states to two or more corresponding software applications 614 based on a level of criticality of the two or more updated configuration states as compared to each other and/or an updated configuration state of one or more other software applications 614 of the asset 602. Yet another example includes automatic cancellation of the application of one or more updated configuration states to the corresponding software application(s) 614 based on a level of criticality of the one or more updated configuration states as compared to an updated configuration state of one or more other software applications 614 of the asset 602. In some embodiments, and for example, the data hub 610 is configured to automatically reorder application of two or more updated configuration states based on a compatibility of the corresponding software applications 614 with each other and/or with one or more other software applications 614 of the asset 602.

The automatic reordering and/or cancellation of the application of an updated configuration state may be based on the availability of personnel, hardware, and/or service capability (e.g., the capability of performing one or more steps of the work instructions and/or other components of the service program, for example at a particular service location), for example personnel, hardware, and/or service capability that may be necessary to complete the update of the software application 614 and/or regular service and/or maintenance of the software and/or hardware components of, or associated with, the software application 614. For example, the data hub 610 may automatically reorder and/or cancel the application of an updated configuration state upon personnel, hardware, and/or service capability becoming available, for example at a particular service location. Moreover, and for example, reordering and/or cancellation by the data hub 610 may include postponing the application of an updated configuration state until personnel, hardware, and/or service capability become available (for example at a particular service location), which may include rerouting of the asset 602 to a particular service location. As should be understood from the above description of the work instructions and the updated configuration state, the automatic reordering and/or cancellation of an updated configuration state by the data hub 610 may include the automatic cancellation and/or reordering of regular service and/or maintenance of the software and/or hardware components of, or associated with, a software application 614.

The data hub 610 may automatically reorder and/or cancel the application of an updated configuration state to one or more of the software applications 614 by changing the work instructions of one or more service programs of the software applications 614. For example, the data hub 610 may add one or more steps to the work instructions, may remove one or more steps from the work instructions, and/or may reorder two or more steps of the work instructions of one or more service programs to accommodate and/or affect the reordering and/or cancellation of one or more updated configuration states.

The data hub 610 may be configured to record and store a log that tracks any reordering and/or cancellations made by the data hub 610. Such a log may include any work instruction change affected by the data hub 610. The data hub 610 may be configured to transmit the log and/or another acknowledgment of such events to the remote location 604.

One specific example of the data hub 610 ability to automatically reorder and/or cancel the application of updated configuration states to software applications 614 of the asset 602 will now be described. The data hub 610 receives a first software update for updating the operating system of a first software application 614 of the asset 602 to a first version. The data hub 610 also receives a second software update for updating a software program of a second software application 614 of the asset 602, and an updated configuration state for updating all of the components of the first software application 614 to a second version. The data hub 610 receives one or more service programs that include work instructions for applying the first software update to the first software application 614, for applying the second software update to the second software application 614, and for applying the updated configuration state to the first software application 614, in that order.

The updated configuration state that updates the first software application 614 to the second version supersedes the first software update of the operating system of the first software application 614 to the first version. Accordingly, the data hub 610 is configured to cancel application of the first software update to the first software application 614. But, to be compatible with the first software application 614, the second software update of the second software application 614 may require that the first software application 614 be updated to the second version. Accordingly, the data hub 610 reorders application of the updated configuration state to the first software application 614 and application of the second software update to the second software application 614 such that the first software application 614 is updated to the second version before the second software application is updated with the second software update. Cancellation of the first software update by the data hub 610 reduces the amount of time it takes to service the asset 602, which may reduce a down time of the asset 602. Reordering of the application of the second software update and the updated configuration state maintains compatibility between the first and second software applications 614 such that the second software update can be successfully applied to the second software application 614.

Figure 7:
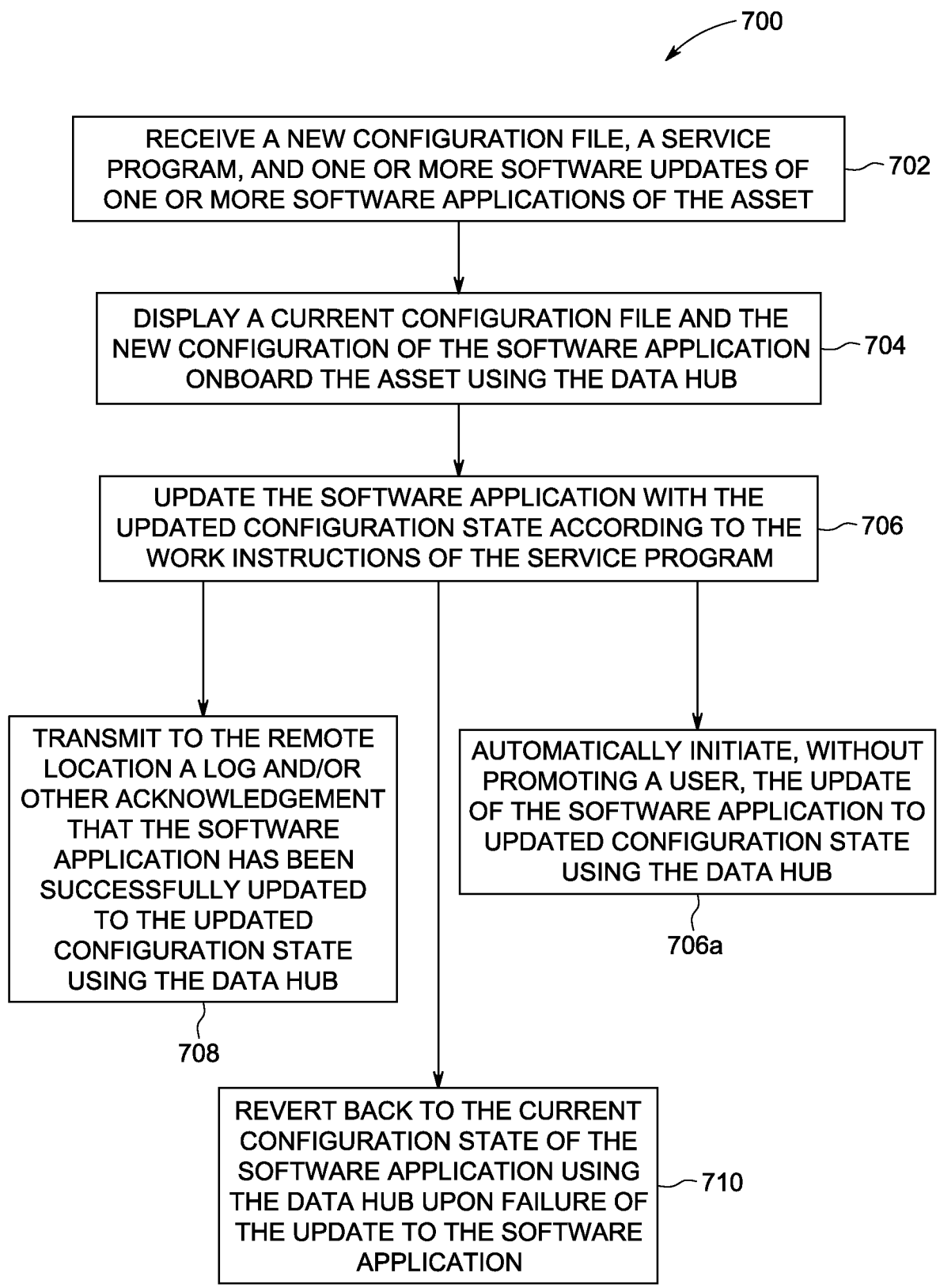
FIG. 7 is a flow chart of a method according to an embodiment of the inventive subject matter described herein.

FIG. 7 is a flow chart of a method 700 according to an embodiment of the inventive subject matter described herein. The method 700 is used to manage updates to the software applications of an asset. The method 700 may be performed by the data hub 610 (shown in FIG. 6) for managing updates to the software applications 614 (shown in FIG. 6) of the asset 602 (shown in FIG. 6), for example. At 702, the method 700 includes receiving, from a remote location (e.g., the remote location 604 shown in FIG. 6), a new configuration file, a service program, and one or more software updates of one or more of software applications of the asset. The new configuration file indicates an updated configuration state of the software application with the software update(s). Optionally, the data hub automatically receives, at 702, the new configuration file, the service program, and the software update without prompting a user to accept the new configuration file, the service program, and software update. In some embodiments, the data hub automatically receives the new configuration file, the service program, and the software update when the asset enters a service location where the asset is intended to be serviced, at a scheduled reception time, when instructed by the remote location, at a time determined by the data hub, and/or at regular or irregular intervals of time determined by, or programmed into, the data hub.

Optionally, the method 700 includes displaying, at 704, a current configuration file of the software application and the new configuration file onboard the asset using the data hub. The method 700 may also includes displaying the work instructions and/or other components of the service program onboard the asset using the data hub.

At 706, the method 700 includes updating the software application of the asset with the updated configuration state according to the work instructions of the service program. Optionally, all of the steps of the work instructions that are required to update the software application to the updated configuration state are performed automatically by the data hub or are performed manually by an operator. Alternatively, some of the steps of the work instructions that are required to update the software application to the updated configuration state are performed by the data hub while other steps of the work instructions are performed manually by an operator. Optionally, updating at 706 the software application with the updated configuration state includes automatically initiating at 706a, without prompting a user, the update of the software application to the updated configuration state using the data hub. The data hub may be configured to automatically initiate at 706a, without prompting the user, the update of a software application to the updated configuration state: upon reception at 702 of the new configuration file, the service program, and/or the software update; at a scheduled time after reception at 702; once the corresponding software application is available to be updated; upon verification that the updated configuration state is a latest version of the software application, and/or upon verification that the updated configuration state is compatible with the current configuration state of the software application and/or is compatible with one or more other software applications of the asset. Moreover, the data hub may be configured to automatically initiate at 706a, without prompting the user, the update of a software application to the updated configuration state based on the availability of personnel, hardware, and/or service capability. For example, the data hub may automatically initiate at 706a, without prompting the user, the application of an updated configuration state upon personnel, hardware, and/or service capability becoming available, for example at a particular service location.

Upon successful application of the updated configuration state to the software application, the method 700 may include transmitting, at 708, to the remote location a log and/or another acknowledgment that the software application has been successfully updated to the updated configuration state using the data hub. If the updated configuration state is not successfully applied to the software application, the method 700 may include reverting, at 710, the software application back to the current configuration state (i.e., the most recent configuration state of the software application before the software application was unsuccessfully updated at 706 to the updated configuration state) using the data hub.

The method 700 optionally includes managing the updates of a plurality of the software applications of the asset. Further, the method 700 may include receiving and applying updated configuration states of software applications of the asset across a variety of different software standards.

Figure 8:
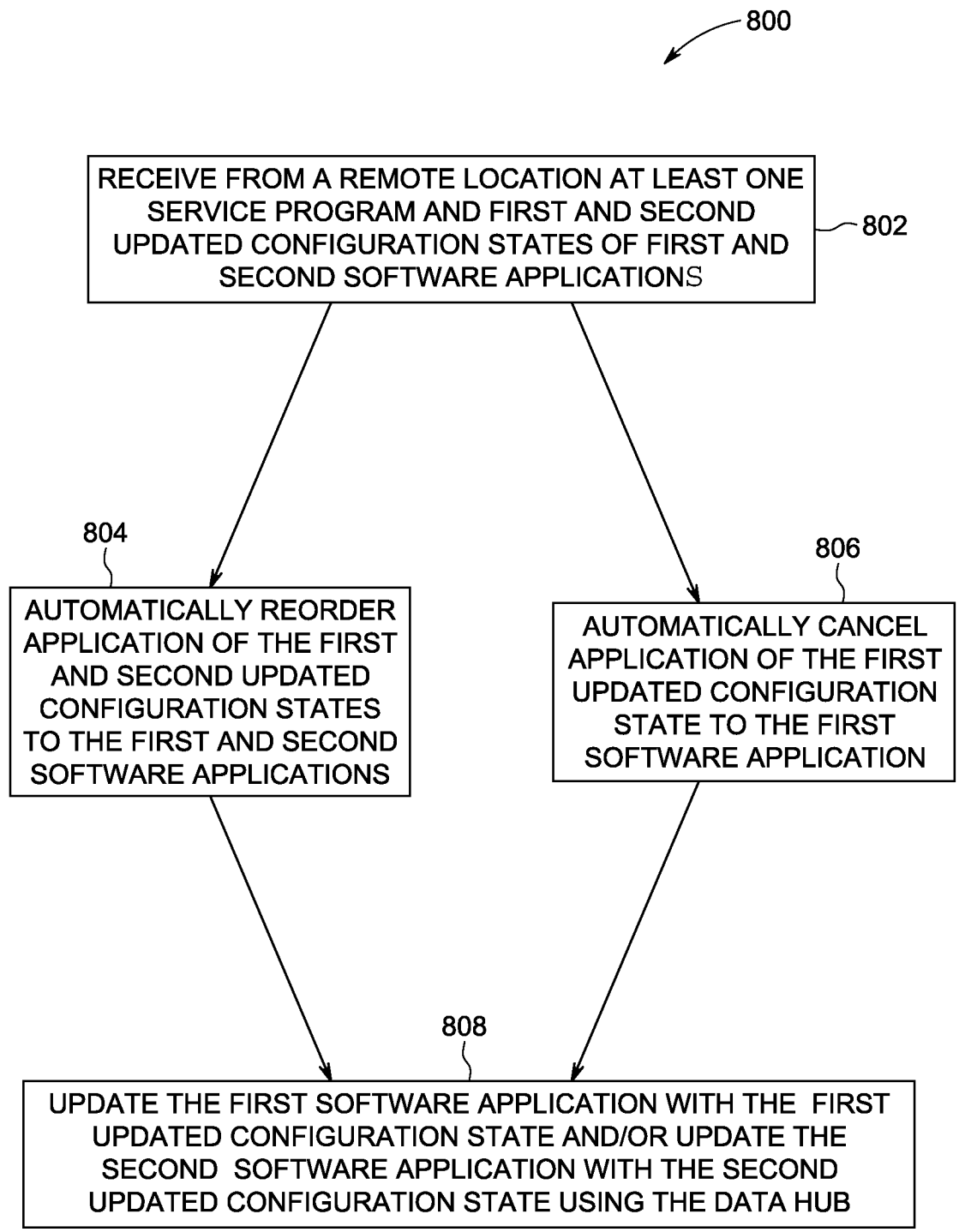
FIG. 8 is a flow chart of another method according to an embodiment of the inventive subject matter described herein.

FIG. 8 is a flow chart of another method 800 according to an embodiment of the inventive subject matter described herein. The method 800 is used to manage updates to the software applications of an asset. The method 800 may be performed by the data hub 610 (shown in FIG. 6) for managing updates to the software applications 614 (shown in FIG. 6) of the asset 602 (shown in FIG. 6), for example. At 802, the method 800 includes receiving, from a remote location (e.g., the remote location 604 shown in FIG. 6), at least one service program and first and second updated configuration states of first and second software applications of the asset. The at least one service program includes work instructions for applying the first and second updated configuration states to the first and second software applications, respectively.

The method 800 optionally includes automatically reordering, at 804, application of the first and second updated configuration states to the first and second software applications, respectively. The first and second updated configuration states may be reordered at 804 based on a compatibility of the first and second software applications with each other and/or with a third software application of the asset, and/or based on a level of criticality of the first updated configuration state as compared to a level of criticality of the second updated configuration state or a third updated configuration state of a third software application of the asset. The data hub may be configured to automatically reorder at 804 based on the availability of personnel, hardware, and/or service capability. For example, reordering at 804 may include postponing the application of an updated configuration state until personnel, hardware, and/or service capability become available (for example at a particular service location), which may include rerouting of the asset to a particular service location.

The method 800 optionally includes automatically canceling, at 806, application of the first updated configuration state to the first software application using the data hub, for example when the first updated configuration state is superseded by a third updated configuration state of the first software application. The data hub may be configured to automatically cancel at 806 based on the availability of personnel, hardware, and/or service capability. For example, canceling at 806 may include postponing the application of an updated configuration state until personnel, hardware, and/or service capability become available (for example at a particular service location), which may include rerouting of the asset to a particular service location.

At 808, the method 800 includes updating the first software application with the first updated configuration state using the data hub and/or updating the second software application with the second updated configuration state using the data hub. The updating at 808 may be performed in the new order selected by the data hub at step 804 of the method 800. Moreover, the updating step 808 of the method 800 may include updating the first software application with the third updated configuration state when the update of the first software application with the first updated configuration state has been superseded by the third updated configuration state as described above.

In an embodiment, a method is provided that includes receiving, at a data hub onboard an asset, a new configuration file, a service program, and a software update of a software application of the asset from a remote location. The data hub includes a current configuration file that indicates a current configuration state of the software application. The new configuration file indicates an updated configuration state of the software application with the software update. The service program includes work instructions for applying the updated configuration state to the software application. The method includes displaying the current configuration file and the new configuration file onboard the asset using the data hub. The method also includes updating the software application with the updated configuration state according to the work instructions of the service program using the data hub.

In an aspect, updating the software application with the updated configuration state includes applying the software update to at least one of an operating system or a software program of the software application.

In an aspect, the data hub automatically receives, without prompting a user, the new configuration file, the service program, and the software update at least one of when the asset enters a service location, at a scheduled reception time, when instructed by the remote location, or at a time determined by the data hub.

In an aspect, the method includes canceling or postponing the update of the software application to the updated configuration state based on a level of criticality of the update as compared to a level of criticality of an update of another software application of the asset.

In an aspect, the method includes canceling the update of the software application to the updated configuration state using the data hub upon supercession of the updated configuration state by another configuration state.

In an aspect, the method includes reordering application of the update of the software application to the updated configuration state relative to an update of another software application of the asset based on the compatibility of the software application with the update of the other software application.

In an aspect, the method includes at least one of removing or reordering steps from the work instructions of the service program using the data hub.

In an aspect, the method includes recording and storing within the data hub a log that indicates that the software application has been updated to the updated configuration state.

In an aspect, the method includes recording and storing within the data hub a log that indicates updates that have been applied to at least one of the software application or one or more other software applications of the asset and indicates updates that have not been applied to at least one of the software application or the one or more other software applications of the asset.

In an aspect, the current configuration file includes at least one of an indication of a current version of the software application, an indication of a current version of an operating system of the software application, an indication of a current version of a software program of the software application, a current software architecture of the software application, a list of one or more hardware components that are currently associated with the software application, a current architecture of hardware associated with the software application, or a log that indicates updates that have been applied to at least one of the software application or one or more other software applications of the asset and indicates updates that have not been applied to at least one of the software application or the one or more other software applications of the asset.

In an aspect, the new configuration file includes at least one of an indication of an updated version of the software application, an indication of an updated version of an operating system of the software application, an indication of an updated version of a software program of the software application, an updated software architecture of the software application, an updated list of one or more hardware components that are associated with the software application, an updated architecture of hardware associated with the software application, or a log that indicates updates that have been applied to at least one of the software application or one or more other software applications of the asset and indicates updates that have not been applied to at least one of the software application or the one or more other software applications of the asset.

In an aspect, the method includes reverting back to the current configuration state of the software application using the data hub upon failure of the update to the updated configuration state.

In an aspect, the data hub automatically updates the software application with the updated configuration state without prompting a user.

In an aspect, updating the software application with the updated configuration state includes manually updating the software application with the updated configuration state by an operator using the work instructions of the service program.

In an aspect, displaying the current configuration file and the new configuration file onboard the asset includes displaying at least one of the service program or the work instructions onboard the asset.

In an aspect, the current configuration state of the software application represents a latest version of the software application that has been functioning on the asset.

In an aspect, the updated configuration state of the software application represents the latest version of the software application.

In an aspect, displaying the current configuration file and the new configuration file onboard the asset using the data hub includes displaying the current configuration file and the new configuration file on a display of the asset.

In an aspect, the method includes transmitting back to the remote location an acknowledgment that the software application has been updated to the updated configuration state.

In an aspect, the data hub is configured to store the new configuration file, the service program, and the software update of the software application until at least one of the software application is available to be updated, verification that the updated configuration state is a currently intended version of the software application, or verification that the updated configuration state is compatible with at least one of the current configuration state or another software application of the asset.

In an aspect, updating the software application with the updated configuration state comprises updating the current configuration file to the updated configuration state or replacing the current configuration file with the new configuration file.

In an aspect, the data hub automatically updates the software application with the updated configuration state, without prompting a user, at least one of: upon reception of the new configuration file, the service program, and the software update; at a scheduled time after reception of the new configuration file, the service program, and the software update; once the at least one software application is available to be updated; upon verification that the updated configuration state is a latest version of the software application; or upon verification that the updated configuration state is compatible with at least one of the current configuration state or another software application of the asset.

In an aspect, the data hub includes at least one of an operating system or a software program of the software application.

In an aspect, the software application is an operating system, a vehicle control system, an equipment control system, an entertainment application, or a business application.

In an embodiment, a system is provided that includes an asset having a software application and a data hub located onboard the asset. The data hub includes a current configuration file that indicates a current configuration state of the software application. The data hub is communicatively connected to the central dispatch station. The data hub is configured to automatically receive from a remote location, without prompting a user, a new configuration file, a service program, and a software update of the software application of the asset. The new configuration file indicates an updated configuration state of the software application with the software update. The service program includes work instructions for applying the updated configuration state to the at least one software application. The data hub is configured to update the software application with the updated configuration state according to the work instructions of the service program including applying the software update to at least one of an operating system or a software program of the software application.

In an aspect, the data hub is configured to automatically update the software application with the updated configuration state without prompting a user.

In an aspect, the data hub is configured to automatically receive the new configuration file, the service program, and the software update from the remote location at least one of when the asset enters a service location, at a scheduled reception time, when instructed by the remote location, or at a time determined by the data hub.

In an aspect, the data hub is configured to automatically update the software application with the updated configuration state, without prompting a user, at least one of: upon reception of the new configuration file, the service program, and the software update; at a scheduled time after reception of the new configuration file, the service program, and the software update; once the at least one software application is available to be updated; upon verification that the updated configuration state is a latest version of the software application; or upon verification that the updated configuration state is compatible with at least one of the current configuration state or another software application of the asset.

In an aspect, the software application is written for a first software standard and the data hub is configured to update another software application of the asset that is written for a second software standard that is different than the first software standard.

In an aspect, the data hub is configured to cancel or postpone the update of the software application to the updated configuration state based on a level of criticality of the update as compared to a level of criticality of an update of another software application of the asset.

In an aspect, the data hub is configured to cancel the update of the software application to the updated configuration state upon supercession of the updated configuration state by another configuration state.

In an aspect, the data hub is configured to reorder application of the update of the software application to the updated configuration state relative to an update of another software application of the asset based on the compatibility of the software application with the update of the other software application.

In an aspect, the data hub is configured to at least one of remove, add, or reorder steps from the work instructions of the service program.

In an aspect, the data hub is configured to record and store a log that indicates that the software application has been updated to the updated configuration state.

In an aspect, the data hub is configured to record and store a log that indicates updates that have been applied to at least one of the software application or one or more other software applications of the asset and indicates updates that have not been applied to at least one of the software application or the one or more other software applications of the asset.

In an aspect, the current configuration file includes at least one of an indication of a current version of the software application, an indication of a current version of an operating system of the software application, an indication of a current version of a software program of the software application, a current software architecture of the software application, a list of one or more hardware components that are currently associated with the software application, a current architecture of hardware associated with the software application, or a log that indicates updates that have been applied to at least one of the software application or one or more other software applications of the asset and indicates updates that have not been applied to at least one of the software application or the one or more other software applications of the asset.

In an aspect, the new configuration file includes at least one of an indication of an updated version of the software application, an indication of an updated version of an operating system of the software application, an indication of an updated version of a software program of the software application, an updated software architecture of the software application, an updated list of one or more hardware components that are associated with the software application, an updated architecture of hardware associated with the software application, or a log that indicates updates that have been applied to at least one of the software application or one or more other software applications of the asset and indicates updates that have not been applied to at least one of the software application or the one or more other software applications of the asset.

In an aspect, the data hub is configured to revert back to the current configuration state of the software application upon failure of the update to the updated configuration state.

In an aspect, the current configuration state of the software application represents a latest version of the software application that has been functioning on the asset.

In an aspect, the updated configuration state of the software application represents the latest version of the software application.

In an aspect, the data hub is configured to transmit back to the remote location an acknowledgment that the software application has been updated to the updated configuration state.

In an aspect, the data hub is configured to display the current configuration file and the new configuration file onboard the asset.

In an aspect, the data hub is configured to display at least one of the service program or the work instructions onboard the asset.

In an aspect, the data hub is configured to store the new configuration file, the service program, and the software update of the software application until at least one of the software application is available to be updated, verification that the updated configuration state is a currently intended version of the software application, or verification that the updated configuration state is compatible with at least one of the current configuration state or another software application of the asset.

In an aspect, the data hub includes at least one of an operating system or a software program of the software application.

In an aspect, the asset is a mobile electronic device, a stationary electronic device, a vehicle, a rail vehicle, a locomotive, an aircraft, an off-highway vehicle, an on-highway vehicle, an automobile, a marine vessel, mining equipment, a wind turbine, a signaling device, or an electrical power generator.

In an aspect, the software application is an operating system, a vehicle control system, an equipment control system, an entertainment application, or a business application.

In an embodiment, a system includes an asset having a plurality of software applications and a data hub located onboard the asset. The data hub includes configuration files for each software application that indicates a current configuration state of the software application. The data hub is communicatively connected to a remote location. The data hub is configured to receive from the remote location at least one service program and first and second updated configuration states of first and second software applications of the plurality of software applications. The at least one service program includes work instructions for applying the first and second updated configuration states to the first and second software applications, respectively. The data hub is configured to automatically at least one of reorder application of the first and second updated configuration states to the first and second software applications, respectively, or cancel application of one of the first or second updated configuration states to the first and second software applications, respectively.

In an aspect, the data hub is configured to automatically reorder application of the first and second updated configuration states based on a compatibility of the first and second software applications with at least one of each other or a third software application of the asset.

In an aspect, the data hub is configured to automatically cancel application of the first updated configuration state based on a supercession of the first updated configuration state by a third updated configuration state of the first software application.

In an aspect, the data hub is configured to automatically at least one of reorder application of the first and second updated configuration states or cancel application of one of the first or second updated configuration states based on a level of criticality of the first updated configuration state as compared to a level of criticality of at least one of the second updated configuration state or a third updated configuration state of a third software application of the asset.

In an aspect, the data hub is configured to automatically at least one of reorder application of the first and second updated configuration states or cancel application of one of the first or second updated configuration states based on the availability of at least one of personnel, hardware, or service capability.

In an aspect, the data hub is configured to at least one of remove, add, or reorder at least one step of the work instructions of the at least one service program to automatically at least one of reorder application of the first and second updated configuration states or cancel application of one of the first or second updated configuration states.

In an aspect, the first and second software applications are written for different software standards.

In an aspect, the data hub is configured to automatically update, without prompting a user, at least one of the first and second software applications with the first and second updated configuration states, respectively.

In an aspect, the work instructions of the at least one service program include instructions for manually updating at least one the first or second software applications with the first and second updated configuration states, respectively.

In an aspect, the data hub is configured to record and store a log that indicates updated configuration states that have been applied to first and second software applications and indicates updated configuration states that have not been applied to first and second software applications.

In an embodiment, a method includes receiving, at a data hub onboard a vehicle, a new configuration file, a service program, and a software update of a software application of the vehicle from a remote location. The data hub includes a current configuration file that indicates a current configuration state of the software application. The new configuration file indicates an updated configuration state of the software application with the software update. The service program includes work instructions for applying the updated configuration state to the software application. The software application includes a vehicle control system that is configured to control operation of the vehicle. The method includes updating the software application with the updated configuration state according to the work instructions of the service program using the data hub.

In an aspect, the method includes displaying the current configuration file and the new configuration file onboard the vehicle using the data hub.

In an aspect, the method includes displaying at least one of the service program or the work instructions onboard the vehicle using the data hub.

In an aspect, the data hub automatically receives, without prompting a user, the new configuration file, the service program, and the software update.

In an aspect, the data hub automatically updates the software application with the updated configuration state without prompting a user.

In an aspect, the vehicle is a rail vehicle.

Various technical advantages of the various embodiments described herein may include reducing or eliminating software download delays and/or reducing or eliminating down time of an asset. Various technical advantages of the various embodiments described herein may include the ability to pre-schedule of any material and/or personnel necessary to service an asset, the ability to reschedule service actions depending on service shop load and/or material availability, and/or the ability for an asset to revert back to the most recent functional state from data stored locally onboard the asset. Various technical advantages of the various embodiments described herein may include the ability of service to be performed on an asset without the need to receive data from a service location and/or without requiring an operator to carry a local computer to the asset.

Various technical advantages of the various embodiments described herein may include dynamic determination, onboard the asset, of the sequences and/or steps required to complete an update to the software application of the asset. Various technical advantages of the various embodiments described herein may include the synchronization of configuration states, software updates, and service programs such that the software update data that is available onboard the asset reflects the configuration state of the latest version of the software application (i.e., is not out of date).

As used herein, an element or step recited in the singular and proceeded with the word "a" or "an" should be understood as not excluding plural of said elements or steps, unless such exclusion is explicitly stated. Furthermore, references to "an embodiment" of the presently described inventive subject matter are not intended to be interpreted as excluding the existence of additional embodiments that also incorporate the recited features. Moreover, unless explicitly stated to the contrary, embodiments "comprising," "including," or "having" (or like terms) an element, which has a particular property or a plurality of elements with a particular property, may include additional such elements that do not have the particular property. Approximating language, as used herein throughout the specification and clauses, may be applied to modify any quantitative representation that could permissibly vary without resulting in a change in the basic function to which the quantitative representation is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be".

As used herein, terms such as "system," "module," or "controller" may include hardware and/or software that operate(s) to perform one or more functions. For example, a system, module, or controller may include a computer processor or other logic-based device that performs operations based on instructions stored on a tangible and non-transitory computer readable storage medium, such as a computer memory. Alternatively, a system, module, or controller may include a hard-wired device that performs operations based on hard-wired logic of the device. The systems, modules, and controllers shown in the Figures may represent the hardware that operates based on software or hardwired instructions, the software that directs hardware to perform the operations, or a combination thereof.

As used herein, terms such as "operably connected," "operatively connected," "operably coupled," "operatively coupled" and the like indicate that two or more components are connected in a manner that enables or allows at least one of the components to carry out a designated function. For example, when two or more components are operably connected, one or more connections (electrical and/or wireless connections) may exist that allow the components to communicate with each other, that allow one component to control another component, that allow each component to control the other component, and/or that enable at least one of the components to operate in a designated manner.

It is to be understood that the subject matter described herein is not limited in its application to the details of construction and the arrangement of elements set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. While the dimensions, types of materials and coatings described herein are intended to define the parameters of the disclosed subject matter, they are by no means limiting and are exemplary embodiments. Many other embodiments will be apparent to those of skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Moreover, unless specifically stated otherwise, any use of the terms "first," "second," etc., do not denote any order or importance, but rather the terms "first," "second," etc., may be used to distinguish one element from another. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   receiving, at a data hub onboard a vehicle, a new configuration file, a service program, and a software update of a software application for the vehicle from a remote location, the data hub configured to manage updating of the software application and including a current configuration file that indicates a current configuration state of the software application that represents software and hardware components associated with the software application, the new configuration file indicating an updated configuration state of the software application with the software update, the service program including work instructions for applying the updated configuration state to the software application, wherein the work instructions comprise at least one of instructions including one or more steps to update a software architecture to accommodate the software update or instructions including one or more steps to modify the hardware components associated with the software application to accommodate the software update;
   displaying the current configuration file and the new configuration file onboard the vehicle using the data hub;
   querying an operational status of the vehicle corresponding to a functional state of the vehicle, wherein the operational status comprises at least one of a plurality of statuses including a stopped condition, wherein the stopped condition comprises brakes of the vehicle being applied; and
   updating the software application with the updated configuration state according to the work instructions of the service program using the data hub when the vehicle is in the stopped condition, wherein the software application is not updated if the vehicle is in at least one of the statuses other than the stopped condition.

2. The method of claim 1, further comprising modifying a trip plan when an update takes longer than expected to be performed.

3. The method of claim 1, wherein the update is applied only if the vehicle is stopped, the brakes of the vehicle are applied, and a planned amount of time for the stoppage of the vehicle as specified by a trip plan is greater than a designated threshold time corresponding to an expected installation time for the update, wherein the trip plan designates at least one of throttle settings or brake settings for performance of a trip by the vehicle along a route.

4. The method of claim 1, wherein the update is applied only if the vehicle is stopped, the brakes of the vehicle are applied, and a planned amount of time for the stoppage of the vehicle as specified by a pre-planned schedule of the vehicle is greater than a designated threshold time corresponding to an expected installation time for the update.

5. The method of claim 1, wherein the data hub automatically receives, without prompting a user, the new configuration file, the service program, and the software update at least one of when the vehicle enters a service location, at a scheduled reception time, when instructed by the remote location, or at a time determined by the data hub, and does not apply the software update until the vehicle is in a stopped condition.

6. The method of claim 1, further comprising canceling or postponing the update of the software application to the updated configuration state based on a level of criticality of the update as compared to a level of criticality of an update of another software application of the vehicle.

7. The method of claim 1, further comprising canceling the update of the software application to the updated configuration state using the data hub upon supercession of the updated configuration state by another configuration state.

8. The method of claim 1, further comprising reordering application of the update of the software application to the updated configuration state relative to an update of another software application of the vehicle based on a compatibility of the software application with the update of the other software application.

9. The method of claim 1, wherein the current configuration file includes at least one of an indication of a current version of the software application, an indication of a current version of an operating system of the software application, an indication of a current version of a software program of the software application, a current software architecture associated with the software application, a list of one or more hardware components that are currently associated with the software application, a current architecture of the hardware components associated with the software application, or a log that indicates updates that have been applied to at least one of the software application or one or more other software applications of the vehicle and indicates updates that have not been applied to at least one of the software application or the one or more other software applications of the vehicle.

10. The method of claim 1, wherein the new configuration file includes at least one of an indication of an updated version of the software application, an indication of an updated version of an operating system of the software application, an indication of an updated version of a software program of the software application, the updated software architecture, an updated list of the hardware components associated with the software application, an updated architecture of the hardware components associated with the software application, or a log that indicates updates that have been applied to at least one of the software application or one or more other software applications of the vehicle and indicates updates that have not been applied to at least one of the software application or the one or more other software applications of the vehicle.

11. The method of claim 1, further comprising reverting back to the current configuration state of the software application using the data hub upon failure of the update to the updated configuration state.

12. The method of claim 1, wherein the data hub automatically updates the software application with the updated configuration state without prompting a user.

13. A system comprising:
a vehicle comprising a software application and a data hub located onboard the vehicle, the data hub configured to manage updating of the software application and including a current configuration file that indicates a current configuration state of the software application that represents software and hardware components associated with the software application, the data hub being communicatively connected to a remote location, wherein the data hub is configured to:
automatically receive from the remote location, without prompting a user, a new configuration file, a service program, and a software update of the software application of the vehicle, the new configuration file indicating an updated configuration state of the software application with the software update, the service program including work instructions for applying the updated configuration state to the software application, wherein the work instructions comprise at least one of instructions including one or more steps to update a software architecture to accommodate the software update or instructions including one or more steps to modify the hardware components associated with the software application to accommodate the software update;
query an operational status of the vehicle corresponding to a functional state of the vehicle; and
when the functional state corresponds to the vehicle being in a stopped condition, wherein the stopped condition comprises brakes of the vehicle being applied, update the software application with the updated configuration state according to the work instructions of the service program including applying the software update to at least one of an operating system or a software program of the software application, wherein the software application is not updated if the vehicle is not in the stopped condition with the brakes of the vehicle applied.

14. The system of claim 13, wherein the data hub is further configured to modify a trip plan when an update takes longer than expected to be performed.

15. The system of claim 13, wherein the data hub is configured to apply the update only if the vehicle is stopped, the brakes of the vehicle are applied, and a planned amount of time for the stoppage of the vehicle as specified by a trip plan is greater than a designated threshold time corresponding to an expected installation time for the update, wherein the trip plan designates at least one of throttle settings or brake settings for performance of a trip by the vehicle along a route.

16. The system of claim 13, wherein the data hub is configured to apply the update only if the vehicle is stopped, the brakes of the vehicle are applied, and a planned amount of time for the stoppage of the vehicle as specified by a pre-planned schedule of the vehicle is greater than a designated threshold time corresponding to an expected installation time for the update.

17. The system of claim 13, wherein the data hub is configured to automatically receive the new configuration file, the service program, and the software update from the remote location at least one of when the vehicle enters a service location, at a scheduled reception time, when instructed by the remote location, or at a time determined by the data hub, and does not apply the software update until the vehicle is in a stopped condition.

18. The system of claim 13, wherein the data hub is configured to automatically update the software application with the updated configuration state, without prompting a user, at least one of:
upon reception of the new configuration file, the service program, and the software update;
at a scheduled time after reception of the new configuration file, the service program, and the software update;
once the at least one software application is available to be updated;
upon verification that the updated configuration state is a latest version of the software application; or
upon verification that the updated configuration state is compatible with at least one of the current configuration state or another software application of the vehicle.

19. The system of claim 13, wherein the software application is written for a first software standard, the data hub being configured to update another software application of the vehicle that is written for a second software standard that is different than the first software standard.

20. The system of claim 13, wherein the data hub is configured to cancel or postpone the update of the software application to the updated configuration state based on a level of criticality of the update as compared to a level of criticality of an update of another software application of the vehicle.

21. The system of claim 13, wherein the data hub is configured to cancel the update of the software application to the updated configuration state upon supercession of the updated configuration state by another configuration state.

22. The system of claim 13, wherein the data hub is configured to revert back to the current configuration state of the software application upon failure of the update to the updated configuration state.

23. A system comprising:
a vehicle comprising a plurality of third party software applications and a data hub located onboard the vehicle, the data hub configured to manage updating of the third party software applications and including configuration files for each software application that indicates a current configuration state of the software application that represents software and hardware components associated with the software application, the data hub being communicatively connected to a remote location, wherein the data hub is configured to:
receive from the remote location at least one service program and first and second updated configuration states of first and second software applications of the plurality of software applications, the at least one service program including work instructions for applying the first and second updated configuration states to the first and second software applications, respectively, wherein the work instructions comprise at least one of instructions including one or more steps to update a software architecture to accommodate the software update or instructions including one or more steps to modify the hardware components associated with the software application to accommodate the software update;
query an operational status of the vehicle corresponding to a functional state of the vehicle, wherein the operational status comprises at least one of a plurality of statuses including a stopped condition, wherein the stopped condition comprises brakes of the vehicle being applied; and when the vehicle is in the stopped condition with the brakes of the vehicle applied, automatically at least one of reorder application of the first and second updated configuration states to the first and second software applications, respectively, or cancel application of one of the first or second updated configuration states to the first and second software applications, respectively.

* * * * *